US012808288B2

(12) United States Patent
Woolford et al.

(10) Patent No.: US 12,808,288 B2
(45) Date of Patent: Nov. 24, 2026

(54) COMPOSITIONS AND METHODS FOR FRACTURE SEALING

(71) Applicant: CHEVRON U.S.A. INC., San Ramon, CA (US)

(72) Inventors: Jeffrey Mark Woolford, Midland, TX (US); Cesar Ovalles, Walnut Creek, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 19/313,802

(22) Filed: Aug. 28, 2025

(65) Prior Publication Data

US 2026/0063022 A1 Mar. 5, 2026

Related U.S. Application Data

(60) Provisional application No. 63/688,104, filed on Aug. 28, 2024.

(51) Int. Cl.

| | |
|---|---|
| ***E21B 43/26*** | (2006.01) |
| ***C09K 8/44*** | (2006.01) |
| ***E21B 41/00*** | (2006.01) |

(52) U.S. Cl.

CPC .............. *E21B 43/261* (2013.01); *C09K 8/44* (2013.01); *E21B 41/0064* (2013.01)

(58) Field of Classification Search

CPC ...... E21B 43/261; E21B 41/0064; C09K 8/44

See application file for complete search history.

(56) References Cited

U.S. PATENT DOCUMENTS

| | | | | |
|---|---|---|---|---|
| 7,213,645 | B2 * | 5/2007 | Sweatman | E21B 21/003 166/250.14 |
| 11,414,974 | B2 | 8/2022 | Entchev et al. | |
| 11,802,232 | B2 | 10/2023 | Almohsin et al. | |
| 2006/0118305 | A1 * | 6/2006 | East | E21B 43/305 166/308.2 |
| 2007/0017676 | A1 | 1/2007 | Reddy et al. | |
| 2013/0075089 | A1 * | 3/2013 | Bour | E21B 43/261 166/250.01 |
| 2016/0290115 | A1 * | 10/2016 | Fleming | C09K 8/70 |

OTHER PUBLICATIONS

NREL paper (R. E. Murray, D. Snowberg, D. Berry, and D. Cousins, Techno-economic Analysis of a Megawatt-Scale Thermoplastic Resin Wind Turbine Blade).

* cited by examiner

*Primary Examiner* — James G Sayre

(74) *Attorney, Agent, or Firm* — HUNTON ANDREWS KURTH LLP

(57) ABSTRACT

Described herein are methods for fracture sealing and redevelopment. Methods for fracture sealing and redevelopment can comprise injecting a sealant composition through a first wellbore in fluid communication with an unconventional subterranean formation such that the sealant composition flows into at least one fracture present in a first region of the unconventional subterranean formation. The sealant composition can solidify within the fracture, thereby at least partially closing the fracture. Subsequently, the unconventional subterranean formation can be fractured via the first wellbore and/or via a second wellbore in fluid communication with an unconventional subterranean formation. The solidified sealant composition can direct fracture formation away from the first region of the unconventional subterranean formation and towards virgin rock.

20 Claims, 5 Drawing Sheets

| PLUG CT SCAN | | | |
|---|---|---|---|
| SLICE ID | MEANS | STD | DEPTH |
| SLICE 1 | 1059.35 | 1325.72 | 1,56000 |
| SLICE 2 | 977.53 | 1260.14 | 4,95000 |

COMPOSITIONS AND METHODS FOR FRACTURE SEALING

CROSS-REFERENCE TO RELATED APPLICATION

This application claims priority to, and the benefit of U.S. Provisional Application 63/688,104, filed on Aug. 28, 2024, the contents of which is hereby incorporated in its entirety.

BACKGROUND

Enhanced oil recovery (EOR) can improve the total recovery of oil extracted from an oil-bearing reservoir. EOR methods are used when primary recovery methods have reached a limit for extracting oil from a reservoir. Unconventional shale enhanced oil recovery efforts and technology are still in their initial stages of development. Currently, the unconventional development industry is still largely progressing through their resources and remaining well locations and benches. However, there exists a need for improved methods for enhancing oil recovery from unconventional reservoirs.

SUMMARY

There is an interest in refracturing existing wells and in the selection of chemical compounds to inject in the primary or in secondary refracturing operation to enhance the effectiveness of the hydraulic fracturing operations. During hydraulic fracturing operations in shale and tight rock reservoirs, new fractures may propagate towards existing fracture networks. This tendency can leave regions of the reservoir untouched by the fractures and, as such, limit the recovery of hydrocarbons from these regions of the reservoir. To improve recovery, strategies are needed that can improve fracture propagation towards previously unfractured (or underfractured) regions of a reservoir.

Accordingly, provided herein are methods that can comprise injecting a sealant composition through a first wellbore in fluid communication with an unconventional subterranean formation such that the sealant composition flows into at least one fracture present in a first region of the unconventional subterranean formation, wherein the sealant composition solidifies within the fracture, thereby at least partially closing the fracture.

In some embodiments, when solidified, the sealant composition is not disposed concentrically about the first wellbore. In some embodiments, when solidified, a portion of the sealant composition extends at least 100 feet from the center of the first wellbore into the fracture.

In some embodiments, the sealant composition solidifies in the fracture by curing.

In some embodiments, when solidified, the sealant composition exhibits a Young's modulus that is lower than a Young's modulus of the unconventional subterranean formation in the first region of the unconventional subterranean formation. In some embodiments, when solidified, the sealant composition exhibits a Young's modulus from 5 GPa to 20 GPa.

In some embodiments, when solidified, the sealant composition exhibits a fracture toughness that is greater than a fracture toughness of the unconventional subterranean formation in the first region of the unconventional subterranean formation. In some embodiments, when solidified, the sealant composition exhibits a fracture toughness from 0.75 MPa $m^{1/2}$ to 1.5 MPa $m^{1/2}$.

In some embodiments, when solidified, the sealant composition exhibits a brittleness index that is lower than a brittleness index of the unconventional subterranean formation in the first region of the unconventional subterranean formation. In some embodiments, when solidified, the sealant composition exhibits a brittleness index from 0.05 to 0.5.

In some embodiments, upon solidification, fluid communication between the first wellbore and an adjacent wellbore is decreased as compared to an original degree of fluid communication between the first wellbore and the adjacent wellbore before injection of the sealant composition. In some embodiments, the fluid communication can be decreased by from 40% to 90%, as determined by a tracer study. In some embodiments, upon injection of a tracer into the first wellbore, an amount of the tracer detected in the adjacent wellbore is decreased by from 40% to 90% as compared to an original amount of said tracer detected in the adjacent wellbore before injection of the sealant composition.

In some embodiments, pressure connectivity between the first wellbore and an adjacent wellbore is decreased as compared to an original pressure connectivity between the first wellbore and the adjacent wellbore before injection of the sealant composition. In some embodiments, upon application of a first pressure to the first wellbore, a second pressure detected in the adjacent wellbore is decreased by from 40% to 90% as compared to an original second pressure detected in the adjacent wellbore before injection of the sealant composition.

In some embodiments, permeability of the first region is decreased as compared to an original permeability of the first region before injection of the sealant composition. In some embodiments, permeability of the first region is decreased by from 50% to 99%. In some embodiments, permeability of the first region is decreased by at least 3 orders of magnitude. In some embodiments, permeability of the first region is decreased to a level below an original permeability of the first region of the unconventional subterranean formation.

In some embodiments, the method further comprises injecting a fracturing fluid through the first wellbore, wherein the fracturing fluid is injected at a pressure and flow rate effective to form a fracture in a second region of the unconventional subterranean formation (e.g., to create freshly opened and connected surface area, increasing access to additional hydrocarbons for recovery). In some embodiments, the method further comprises (a) injecting the sealant composition through the first wellbore in fluid communication with the unconventional subterranean formation such that the sealant composition flows into the at least one fracture present in the first region in proximity to the first wellbore, wherein the sealant composition solidifies within the fracture, thereby at least partially closing the fracture; (b) injecting a fracturing fluid through the first wellbore, wherein the fracturing fluid is injected at a pressure and flow rate effective to form a fracture in a second region of the unconventional subterranean formation; and (c) producing fluids from the first wellbore.

In some embodiments, the method further comprises injecting a fracturing fluid through a second wellbore in fluid communication with the unconventional subterranean formation, wherein the fracturing fluid is injected at a pressure and flow rate effective to form a fracture in a second region of the unconventional subterranean formation (e.g., to create freshly opened and connected surface area, increasing access to additional hydrocarbons for recovery). In some embodiments, the method further comprises (a) injecting the sealant composition through the first wellbore in fluid communication with the unconventional subterranean formation such that the sealant composition flows into the at least one fracture present in the first region in proximity to the first wellbore, wherein the sealant composition solidifies within the fracture, thereby at least partially closing the fracture; (b) injecting a fracturing fluid through the second wellbore in fluid communication with the unconventional subterranean formation, wherein the fracturing fluid is injected at a pressure and flow rate effective to form a fracture in a second region of the unconventional subterranean formation; and (c) producing fluids from the first wellbore, the second wellbore, or any combination thereof.

In some embodiments, when solidified, the sealant composition inhibits initiation of fractures in the first region. In some embodiments, when solidified, the sealant composition preferentially directs the initiation of fractures toward the second region.

In some embodiments, the second wellbore comprises an existing wellbore. In other embodiments, the second wellbore comprises a new wellbore. In some embodiments, the second wellbore comprises an infill wellbore.

In some embodiments, the second region is previously unfractured or underfractured. In some embodiments, when solidified, the sealant composition increases the formation of fractures in the second region.

In some embodiments, the method further comprises injecting an etching agent through the first wellbore, thereby at least partially removing the solidified sealant composition. In some embodiments, the etching agent comprises a strong acid or a strong base. In some embodiments, injection of the etching agent increases fluid flow through the fracture in the first region of the unconventional subterranean formation. In some embodiments, injection of the etching agent increases permeability of the first region as compared to a permeability of the first region after injection of the sealant composition but before injection of the etching agent.

In some embodiments, the sealant composition comprises an inorganic gel. In some embodiments, the inorganic gel comprises silica, alumina, an aluminosilicate, or any combination thereof. In some embodiments, the inorganic gel comprises a plurality of nanoparticles. In some embodiments, the inorganic gel has a solids content of from 1% to 15%. In some embodiments, the inorganic gel comprises one or more stabilizing agents (e.g., an ammonium cation).

In some embodiments, the inorganic gel solidifies upon contact with a pH altering agent. In some embodiments, the method further comprises injecting the pH altering agent through the first wellbore in fluid communication with the unconventional subterranean formation such that the pH altering agent induces solidification of the inorganic gel within the at least one fracture.

In some embodiments, the sealant composition comprises a polymer. In some embodiments, the polymer solidifies upon reaction with a crosslinker. In some embodiments, the method further comprises injecting the crosslinker through the first wellbore in fluid communication with the unconventional subterranean formation such that the crosslinker reacts with and crosslinks the polymer, inducing solidification of the polymer within the at least one fracture. In some embodiments, the crosslinker is carbon dioxide based. In some embodiments, the crosslinked polymer gel is retained in the closed fracture, thereby storing carbon dioxide in the at least one fracture.

In some embodiments, the polymer is derived from at least one carbon dioxide-based monomer. In some embodiments, the polymer is retained in the closed fracture, thereby storing carbon dioxide in the at least one fracture.

In some embodiments, the polymer solidifies upon crosslinking with inorganic nanoparticles. In some embodiments, the inorganic nanoparticles comprise silica, alumina, aluminosilicates, or any combination thereof.

In some embodiments, the polymer comprises a thermosetting resin. In some embodiments, the thermosetting resin comprises an epoxy resin, a urethane resin, a polycarbonate resin, a (meth)acrylate resin, a polyolefin resin, such as a polyethylene resin, a crosslinked polyethylene (PEX) resin, or a polypropylene resin, or any combination thereof.

In some embodiments, the polymer comprises a two-part curable polymer system.

In some embodiments, the sealant composition comprises a cement. In some embodiments, the cement solidifies via a mineralization reaction. In some embodiments, the cement solidifies upon injection of water. In other embodiments, the cement solidifies upon injection of carbon dioxide. In some embodiments, the solidified cement is retained in the closed fracture, thereby storing carbon dioxide in the at least one fracture.

In some embodiments, the sealant composition comprises any combination of an inorganic gel, a polymer, and a cement.

In some embodiments, the sealant composition further comprises a filler. In some embodiments, the filler comprises fibers, a particulate filler, or any combination thereof. In some embodiments, the filler comprises a shape memory filler.

In some embodiments, the sealant composition has a carbon intensity (CI) from 2 kg $CO_2$ to 6 kg $CO_2$ per kg sealant composition.

In some embodiments, injecting the sealant composition through a first wellbore further comprises injecting carbon dioxide through the first wellbore. In some embodiments, carbon dioxide is injected through the first wellbore before injection of the sealant composition. In some embodiments, the carbon dioxide is bubbled through the injected sealant composition. In some embodiments, the solidified sealant composition is retained in the closed fracture, thereby storing carbon dioxide in the at least one fracture.

In some embodiments, the sealant composition is a fluid sealant composition. In some embodiments, the sealant composition has a viscosity of from 1 cp to 100 cp at a temperature of the unconventional subterranean formation.

In some embodiments, the method further comprises injecting a chaser through the first wellbore after injection of the sealant composition, thereby pushing the sealant composition further into the at least one fracture. The chaser can have a higher viscosity than the sealant composition. In some embodiments, the chaser can comprise an aqueous injection fluid. In some embodiments, the aqueous injection fluid can comprise a polymer.

In some embodiments, injecting the sealant composition through a first wellbore can further comprise sequentially injecting a plurality of sealant compositions having increasing viscosity through the first wellbore. In some embodiments, injecting the sealant composition through a first wellbore can comprise (i) injecting a first sealant composition having a first viscosity at a temperature of the unconventional subterranean formation through the first wellbore; (ii) injecting a second sealant composition having a second viscosity at a temperature of the unconventional subterranean formation through the first wellbore; and (iii) injecting a third sealant composition having a third viscosity at a temperature of the unconventional subterranean formation through the first wellbore; wherein each of the first sealant composition, the second sealant composition, and the third sealant composition each solidify within the fracture, thereby at least partially closing the fracture. In some embodiments, the second viscosity is from 10% to 150% greater than the first viscosity, and the third viscosity is from 10% to 150% greater than the second viscosity. In some embodiments, each sealant composition extends substantially concentrically into the unconventional subterranean formation from the first wellbore, and injection of each sealant composition pushes already-injected sealant compositions further into the fracture.

Also provided herein are methods for storing carbon dioxide within an unconventional subterranean formation. These methods can comprise injecting a sealant composition through a first wellbore in fluid communication with the unconventional subterranean formation such that the sealant composition flows into at least one fracture present in a first region of the first wellbore, wherein the sealant composition solidifies within the fracture, thereby at least partially closing the fracture. In some of these embodiments, the solidified sealant can have a carbon intensity (CI) of from 2 kg $CO_2$ to 6 kg $CO_2$.

DETAILED DESCRIPTION

Figure 1A:
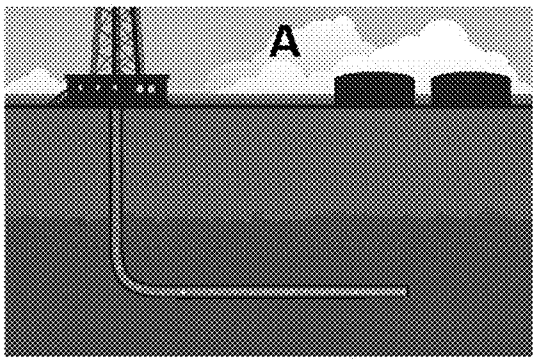
FIGS. 1A-1D depict an example method of fracture sealing and redevelopment as described herein. A first wellbore is drilled (FIG. 1A) and fractured (FIG. 1B) and hydrocarbons are produced therefrom. The sealant composition is then injected through the wellbore such that it enters the fracture (FIG. 1C) where it solidifies. After sufficient solidification, a fracturing fluid can be injected into the wellbore, thereby producing a fracture in a region of the unconventional subterranean formation that has not previously been fractured (FIG. 1D).
Figure 1B:
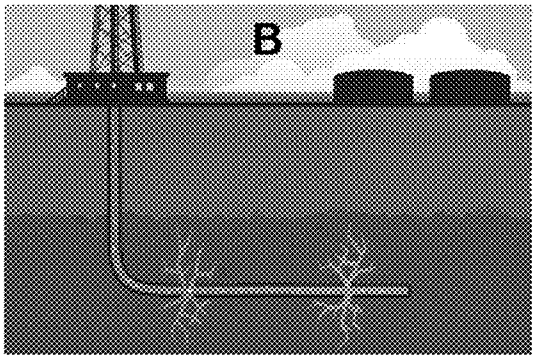
Figure 1C:
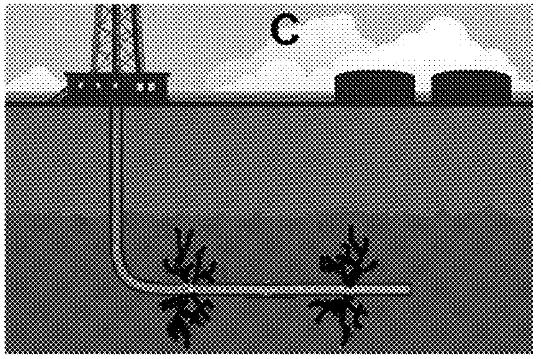
Figure 1D:
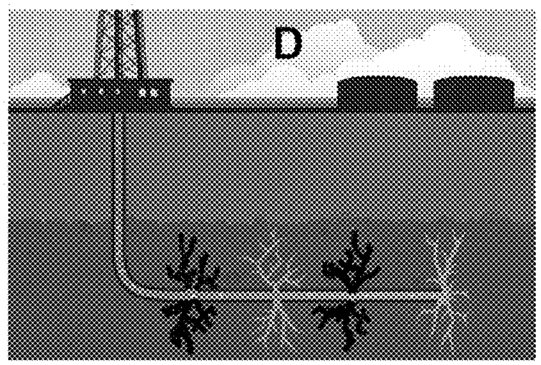

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprise" and/or "comprising." when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if a composition is described herein as including a component of type A, a component of type B, a component of type C, or any combination thereof, it is understood that this phrase describes all of the various individual and collective combinations and permutations of these components. For example, in some embodiments, the composition described by this phrase could include only a component of type A. In some embodiments, the composition described by this phrase could include only a component of type B. In some embodiments, the composition described by this phrase could include only a component of type C. In some embodiments, the composition described by this phrase could include a component of type A and a component of type B. In some embodiments, the composition described by this phrase could include a component of type A and a component of type C. In some embodiments, the composition described by this phrase could include a component of type B and a component of type C. In some embodiments, the composition described by this phrase could include a component of type A, a component of type B, and a component of type C. In some embodiments, the composition described by this phrase could include two or more components of type A (e.g., A1 and A2). In some embodiments, the composition described by this phrase could include two or more components of type B (e.g., B1 and B2). In some embodiments, the composition described by this phrase could include two or more components of type C (e.g., C1 and C2). In some embodiments, the composition described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the composition described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the composition described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

"Hydrocarbon-bearing formation" or simply "formation" refers to the rock matrix in which a wellbore may be drilled. For example, a formation refers to a body of rock that is sufficiently distinctive and continuous such that it can be mapped. It should be appreciated that while the term "formation" generally refers to geologic formations of interest, that the term "formation." as used herein, may, in some instances, include any geologic points or volumes of interest (such as a survey area).

"Unconventional formation" is a subterranean hydrocarbon-bearing formation that generally requires intervention in order to recover hydrocarbons from the reservoir at economic flow rates or volumes. For example, an unconventional formation includes reservoirs having an unconventional microstructure in which fractures are used to recover hydrocarbons from the reservoir at sufficient flow rates or volumes (e.g., an unconventional reservoir generally needs to be fractured under pressure or have naturally occurring fractures in order to recover hydrocarbons from the reservoir at sufficient flow rates or volumes).

In some embodiments, the unconventional formation can include a reservoir having a permeability of less than 25 millidarcy (mD) (e.g., 20 mD or less, 15 mD or less, 10 mD or less, 5 mD or less, 1 mD or less, 0.5 mD or less, 0.1 mD or less, 0.05 mD or less, 0.01 mD or less, 0.005 mD or less, 0.001 mD or less, 0.0005 mD or less, 0.0001 mD or less, 0.00005 mD or less, 0.00001 mD or less, 0.000005 mD or less, or 0.000001 mD or less). In some embodiments, the unconventional formation can include a reservoir having a permeability of at least 0.000001 mD (e.g., at least 0.000005 mD, at least 0.00001 mD, 0.00005 mD, at least 0.0001 mD. 0.0005 mD, 0.001 mD, at least 0.005 mD, at least 0.01 mD, at least 0.05 mD, at least 0.1 mD, at least 0.5 mD, at least 1 mD, at least 5 mD, at least 10 mD, at least 15 mD, or at least 20 mD).

The unconventional formation can include a reservoir having a permeability ranging from any of the minimum values described above to any of the maximum values described above. For example, in some embodiments, the unconventional formation can include a reservoir having a permeability of from 0.000001 mD to 25 mD (e.g., from 0.001 mD to 25 mD, from 0.001 mD to 10 mD, from 0.01 mD to 10 mD, from 0.1 mD to 10 mD, from 0.001 mD to 5 mD, from 0.01 mD to 5 mD, or from 0.1 mD to 5 mD). When referring to a permeability value of a formation, the permeability value can comprise an average value for the permeability of samples across a region of the formation.

The formation may include faults, fractures (e.g., naturally occurring fractures, fractures created through hydraulic fracturing, etc.), geobodies, overburdens, underburdens, horizons, salts, salt welds, etc. The formation may be onshore, offshore (e.g., shallow water, deep water, etc.), etc. Furthermore, the formation may include hydrocarbons, such as liquid hydrocarbons (also known as oil or petroleum), gas hydrocarbons, a combination of hydrocarbons (e.g., a combination of liquid hydrocarbons and gas hydrocarbons (e.g. including gas condensate)), etc.

The formation, the hydrocarbons, or both may also include non-hydrocarbon items, such as pore space, connate water, brine, fluids from enhanced oil recovery, etc. The formation may also be divided up into one or more hydrocarbon zones, and hydrocarbons can be produced from each desired hydrocarbon zone.

The term formation may be used synonymously with the term reservoir or "subsurface reservoir" or "subsurface region of interest" or "subsurface formation" or "subsurface volume of interest". In some embodiments, the reservoir may be, but is not limited to, a shale reservoir, etc. Indeed, the terms "formation," "reservoir," "hydrocarbon," and the like are not limited to any description or configuration described herein.

"Wellbore" refers to a continuous hole for use in hydrocarbon recovery, including any openhole or uncased portion of the wellbore. For example, a wellbore may be a cylindrical hole drilled into the formation such that the wellbore is surrounded by the formation, including rocks, sands, sediments, etc. A wellbore may be used for injection. A wellbore may be used for production. A wellbore may be used for hydraulic fracturing of the formation. A wellbore even may be used for multiple purposes, such as injection and production. The wellbore may have vertical, inclined, horizontal, or any combination of trajectories. For example, the wellbore may be a vertical wellbore, a horizontal wellbore, a multilateral wellbore, an inclined wellbore, a slanted wellbore, etc. The deviation of the wellbore may change, for example, the deviation is changing when the wellbore is curving. The wellbore may include a plurality of components, such as, but not limited to, a casing, a liner, a tubing string, a heating element, a sensor, a packer, a screen, a gravel pack, etc. The wellbore may also include equipment to control fluid flow into the wellbore, control fluid flow out of the wellbore, or any combination thereof. For example, each wellbore may include a wellhead, a BOP, chokes, valves, or other control devices. These control devices may be located on the surface, under the surface (e.g., downhole in the wellbore), or any combination thereof. The wellbore may also include at least one artificial lift device, such as, but not limited to, an electrical submersible pump (ESP) or gas lift. The wellbore may be drilled into the formation using practically any drilling technique and equipment known in the art, such as geosteering, directional drilling, etc. The term wellbore is not limited to any description or configuration described herein. The term wellbore may be used synonymously with the terms borehole or well.

"Fracturing" is one way that hydrocarbons may be recovered (sometimes referred to as produced) from the formation. For example, hydraulic fracturing may entail preparing a fracturing fluid and injecting that fracturing fluid into the wellbore at a sufficient rate and pressure to open existing fractures and/or create fractures in the formation. The fractures permit hydrocarbons to flow more freely into the wellbore. In the hydraulic fracturing process, the fracturing fluid may be prepared on-site to include at least proppants. The proppants, such as sand or other particles, are meant to hold the fractures open so that hydrocarbons can more easily flow to the wellbore. The fracturing fluid and the proppants may be blended together using at least one blender. The fracturing fluid may also include other components in addition to the proppants.

The wellbore and the formation proximate to the wellbore are in fluid communication (e.g., via perforations), and the fracturing fluid with the proppants is injected into the wellbore through a wellhead of the wellbore using at least one pump (oftentimes called a fracturing pump). The fracturing fluid with the proppants is injected at a sufficient rate and pressure to open existing fractures and/or create fractures in the subsurface volume of interest. As fractures become sufficiently wide to allow proppants to flow into those fractures, proppants in the fracturing fluid are deposited in those fractures during injection of the fracturing fluid. After the hydraulic fracturing process is completed, the fracturing fluid is removed by flowing or pumping it back out of the wellbore so that the fracturing fluid does not block the flow of hydrocarbons to the wellbore. The hydrocarbons will typically enter the same wellbore from the formation and go up to the surface for further processing.

The equipment to be used in preparing and injecting the fracturing fluid may be dependent on the components of the fracturing fluid, the proppants, the wellbore, the formation, etc. However, for simplicity, the term "fracturing apparatus" is meant to represent any tank(s), mixer(s), blender(s), pump(s), manifold(s), line(s), valve(s), fluid(s), fracturing fluid component(s), proppants, and other equipment and non-equipment items related to preparing the fracturing fluid and injecting the fracturing fluid.

Other hydrocarbon recovery processes may also be utilized to recover the hydrocarbons. Furthermore, those of ordinary skill in the art will appreciate that one hydrocarbon recovery process may also be used in combination with at least one other recovery process or subsequent to at least one other recovery process.

"Friction reducer," as used herein, refers to a chemical additive that alters fluid rheological properties to reduce friction created within the fluid as it flows through small-diameter tubulars or similar restrictions (e.g., valves, pumps). Generally, polymers, or similar friction reducing agents, add viscosity to the fluid, which reduces the turbulence induced as the fluid flows. Reductions in fluid friction of greater than 50% (e.g., from 50% to 250% or from 50% to 100%) are possible depending on the friction reducer utilized, which allows the injection fluid to be injected into a wellbore at a much higher injection rate (e.g., between 60 to 100 barrels per minute) and also lower pumping pressure during proppant injection.

"Injection fluid," as used herein, refers to any fluid which is injected into a reservoir via a well. "Fracturing fluid," as used herein, refers to an injection fluid that is injected into the well under pressure in order to cause fracturing within a portion of the reservoir.

The term "interfacial tension" or "IFT" as used herein refers to the surface tension between test oil and water of different salinities containing a surfactant formulation at different concentrations. Typically, interfacial tensions are measured using a spinning drop tensiometer or calculated from phase behavior experiments.

The term "proximate" is defined as "near". If item A is proximate to item B, then item A is near item B. For example, in some embodiments, item A may be in contact with item B. For example, in some embodiments, there may be at least one barrier between item A and item B such that item A and item B are near each other, but not in contact with each other. The barrier may be a fluid barrier, a non-fluid barrier (e.g., a structural barrier), or any combination thereof. Both scenarios are contemplated within the meaning of the term "proximate."

Unless defined otherwise, all technical and scientific terms used herein have the same meanings as commonly understood by one of skill in the art to which the disclosed invention belongs. Unless otherwise specified, all percentages are in weight percent and the pressure is in atmospheres. All citations referred to herein are expressly incorporated by reference.

Methods

Provided are methods for fracture sealing and redevelopment. Methods for fracture sealing and redevelopment in an unconventional subterranean formation that has previously been fractured can include injecting a sealant composition through a first wellbore in fluid communication with an unconventional subterranean formation. In some embodiments, the first wellbore can be preexisting. In some embodiments, the first wellbore can be from a previous fracturing operation. In some embodiments, the first wellbore can include a horizontal portion and/or a vertical portion. In some embodiments, the first wellbore can include a diagonal portion.

In some embodiments, the first wellbore can have been under production prior to injection of the sealant composition. For example, in some embodiments, the first wellbore can have been under production for at least three months (e.g., at least six months, at least one year, at least two years, at least three years, at least four years, at least five years, at least ten years, at least twenty years, or more) prior to injection of the sealant composition. In some embodiments, the first wellbore was under production for from three months to twenty years (e.g., from one year to ten years, or from one year to five years) prior to injection of the sealant composition.

In some embodiments, at least 10,000 barrels of hydrocarbon (e.g., at least 20,000 barrels of hydrocarbon, at least 30,000 barrels of hydrocarbon, at least 40,000 barrels of hydrocarbon, at least 50,000 barrels of hydrocarbon, at least 100,000 barrels of hydrocarbon, at least 200,000 barrels of hydrocarbon, at least 300,000 barrels of hydrocarbon, at least 400,000 barrels of hydrocarbon, or at least 500,000 barrels of hydrocarbon) can have been produced from the existing wellbore prior to injection of the sealant composition. In some embodiments, from 10,000 barrels of hydrocarbon to 500,000 barrels of hydrocarbon were produced from the existing wellbore prior to injection of the sealant composition.

In some embodiments, the unconventional subterranean formation can include at least one fracture in a first region in proximity to the first wellbore. In some embodiments, the fracture can be preexisting. In some embodiments, the fracture can be from a previous fracturing operation. In some embodiments, the fracture can be naturally occurring. The first region of the unconventional subterranean formation (and, by extension, the fracture(s) therein) can be disposed at any point along the length of the wellbore.

In some embodiments, a chaser can be injected through the first wellbore after injection of the sealant composition, thereby pushing the sealant composition further into the at least one fracture. Examples of suitable chasers can include a variety of aqueous injection fluids. In some embodiments, the chaser can have a higher viscosity than the sealant composition. In some embodiments, the chaser can comprise, for example, an aqueous polymer solution.

In some embodiments, the sealant composition can solidify in the fracture, thereby closing the fracture. For example, in some embodiments, the sealant composition can solidify by curing. In some embodiments, the sealant composition can solidify by chemical maturation. The term "curing" as used herein refers to the physical or chemical conversion of a fluidic composition to a solid composition, for example, via polymerization, crosslinking, volatilization of a solvent or suspension medium, diffusion of a solvent or suspension medium, cement setting, or any combination thereof.

In some embodiments, when solidified, the sealant composition is not disposed concentrically about the first wellbore. For example, in some embodiments, when solidified, the sealant composition can extend into the fractures and not be exclusively localized around the outer walls of the wellbore. In some embodiments, when solidified, a portion of the sealant composition can extend at least 100 feet (e.g., at least 125 feet, at least 150 feet, at least 175 feet, at least 200 feet, or at least 250 feet) from the center of the first wellbore into the fracture while another portion of the sealant composition may be localized around the outer walls of the wellbore.

In some embodiments, when solidified, the sealant composition can exhibit a Young's modulus that is lower than a Young's modulus of the unconventional subterranean formation. For example, in some embodiments, the solidified sealant composition can exhibit a Young's modulus lower than 20 GPa, (e.g., lower than 19 GPa, lower than 18 GPa, lower than 17 GPa, lower than 16 GPa, lower than 15 GPa, lower than 14 GPa, lower than 13 GPa, lower than 12 GPa, lower than 11 GPa, lower than 10 GPa, lower than 9 GPa, lower than 8 GPa, lower than 7 GPa, lower than 6 GPa, or lower than 5 GPa). In some embodiments, the solidified sealant composition can exhibit a Young's modulus of at least 5 GPa (e.g., at least 6 GPa, at least 7 GPa, at least 8 GPa, at least 9 GPa, at least 10 GPa, at least 11 GPa, at least 12 GPa, at least 13 GPa, at least 14 GPa, at least 15 GPa, at least 16 GPa, at least 17 GPa, at least 18 GPa, at least 19 GPa, or at least 20 GPa).

The solidified sealant composition can exhibit a Young's modulus ranging from any of the minimum values described above to any of the maximum values described above. For example, in some embodiments, the sealant composition can exhibit a Young's modulus of from 5 GPa to 20 GPa (e.g., from 6 GPa to 19 GPa, from 7 GPa to 18 GPa, from 8 GPa to 17 GPa, from 9 GPa to 16 GPa, from 10 GPa to 15 GPa, from 11 GPa to 14 GPa, from 12 GPa to 13 GPa, from 5 GPa to 13 GPa, from 6 GPa to 12 GPa, from 7 GPa to 11 GPa, from 8 GPa to 10 GPa, from 12 GPa to 20 GPa, from 13 GPa to 19 GPa, from 14 GPa to 18 GPa, or from 15 GPa to 17 GPa).

In some embodiments, when solidified, the sealant composition can exhibit a fracture toughness that is greater than a fracture toughness of the unconventional subterranean formation. "Fracture toughness" refers to the ability of a material to absorb energy and deform plastically before fracturing. Fracture toughness can be measured using methods known in the art, including standard test methods described in ASTM E1820-18, entitled "Standard Test Method for Measurement of Fracture Toughness" which is incorporated herein by reference in its entirety.

In some embodiments, the solidified sealant composition can exhibit a fracture toughness greater than 0.75 MPa $m^{1/2}$ (e.g., greater than 0.8 MPa $m^{1/2}$, greater than 0.85 MPa $m^{1/2}$, greater than 0.9 MPa $m^{1/2}$, greater than 0.95 MPa $m^{1/2}$, greater than 1 MPa $m^{1/2}$, greater than 1.05 MPa $m^{1/2}$, greater than 1.1 MPa $m^{1/2}$, greater than 1.15 MPa $m^{1/2}$, greater than 1.2 MPa $m^{1/2}$, greater than 1.25 MPa $m^{1/2}$, greater than 1.3 MPa $m^{1/2}$, greater than 1.35 MPa $m^{1/2}$, greater than 1.4 MPa $m^{1/2}$, greater than 1.45 MPa $m^{1/2}$, greater than 1.5 MPa $m^{1/2}$). In some embodiments, the solidified sealant composition can exhibit a fracture toughness of at least 1.5 MPa $m^{1/2}$ (e.g., at least 1.45 MPa $m^{1/2}$, at least 1.4 MPa $m^{1/2}$, at least 1.35 MPa $m^{1/2}$, at least 1.3 MPa $m^{1/2}$, at least 1.25 MPa $m^{1/2}$, at least 1.2 MPa $m^{1/2}$, at least 1.15 MPa $m^{1/2}$, at least 1.1 MPa $m^{1/2}$, at least 1.05 MPa $m^{1/2}$, at least 1 MPa $m^{1/2}$, at least 0.95 MPa $m^{1/2}$, at least 0.9 MPa $m^{1/2}$, at least 0.85 MPa $m^{1/2}$, at least 0.8 MPa $m^{1/2}$, or at least 0.75 MPa $m^{1/2}$).

The solidified sealant composition can exhibit a fracture toughness ranging from any of the minimum values described above to any of the maximum values described above. For example, in some embodiments, the sealant composition can exhibit a fracture toughness of from 0.75 MPa $m^{1/2}$ to 1.5 MPa $m^{1/2}$ (e.g., from 0.8 MPa $m^{1/2}$ to 1.45 MPa $m^{1/2}$, from 0.85 MPa $m^{1/2}$ to 1.4 MPa $m^{1/2}$, from 0.9 MPa $m^{1/2}$ to 1.35 MPa $m^{1/2}$, from 0.95 MPa $m^{1/2}$ to 1.3 MPa $m^{1/2}$, from 1 MPa $m^{1/2}$ to 1.25 MPa $m^{1/2}$, from 1.05 MPa $m^{1/2}$ to 1.2 MPa $m^{1/2}$, from 1.1 MPa $m^{1/2}$ to 1.15 MPa $m^{1/2}$, from 0.75 MPa $m^{1/2}$ to 1.15 MPa $m^{1/2}$, from 0.8 MPa $m^{1/2}$ to 1.1 MPa $m^{1/2}$, from 0.85 MPa $m^{1/2}$ to 1.05 MPa $m^{1/2}$, from 0.9 MPa $m^{1/2}$ to 1 MPa $m^{1/2}$, from 1.1 MPa $m^{1/2}$ to 1.5 MPa $m^{1/2}$, from 1.15 MPa $m^{1/2}$ to 1.45 MPa $m^{1/2}$, from 1.2 MPa $m^{1/2}$ to 1.4 MPa $m^{1/2}$, or from 1.25 MPa $m^{1/2}$ to 1.35 MPa $m^{1/2}$).

In some embodiments, when solidified, the sealant composition can exhibit a brittleness index that is lower than a brittleness index of the unconventional subterranean formation. The brittleness index can be determined using methods known in the art. By way of example, Enderlin et al., describes calculating the Brittleness Index (BI), with the following equation:

$$BI = \frac{\left(\frac{E-1}{7}\right) + \left(\frac{v-0.4}{-0.25}\right)}{2}$$

where E is the Static Young's modulus (calibrated), and v is Poisson's ratio. See Enderlin et al., Predicting Fracability in Shale Reservoirs, Search and Discovery Article No. 40782, p. 2 (2011), which is incorporated herein by reference.

In some embodiments, when solidified, the sealant composition can exhibit a brittleness index less than 0.5 (e.g., less than 0.48, less than 0.46, less than 0.44, less than 0.42, less than 0.4, less than 0.38, less than 0.36, less than 0.34, less than 0.32, less than 0.3, less than 0.28, less than 0.26, less than 0.24, less than 0.22, less than 0.2, less than 0.18, less than 0.16, less than 0.14, less than 0.12, less than 0.1, less than 0.08, less than 0.06, or less than 0.05). In some embodiments, the solidified sealant composition can exhibit a brittleness index of at least 0.05 (e.g., at least 0.06, at least 0.08, at least 0.1, at least 0.12, at least 0.14, at least 0.16, at least 0.18, at least 0.2, at least 0.22, at least 0.24, at least 0.26, at least 0.28, at least 0.3, at least 0.32, at least 0.34, at least 0.36, at least 0.38, at least 0.4, at least 0.42, at least 0.44, at least 0.46, at least 0.48, or at least 0.5).

The solidified sealant composition can exhibit a brittleness index ranging from any of the minimum values described above to any of the maximum values described above. For example, in some embodiments, the sealant composition can exhibit a brittleness index of from 0.05 to 0.5 (e.g., from 0.06 to 0.48, from 0.08 to 0.46, from 0.1 to 0.44, from 0.12 to 0.42, from 0.14 to 0.4, from 0.16 to 0.42, from 0.18 to 0.4, from 0.2 to 0.38, from 0.22 to 0.36, from 0.24 to 0.38, from 0.26 to 0.36, from 0.28 to 0.34, from 0.3 to 0.32, from 0.05 to 0.32, from 0.06 to 0.3, from 0.08 to 0.28, from 0.1 to 0.26, from 0.12 to 0.24, from 0.14 to 0.22, from 0.16 to 0.2, from 0.3 to 0.5, from 0.32 to 0.48, from 0.34 to 0.46, from 0.36 to 0.44, or from 0.38 to 0.42).

In some embodiments, the fluid communication between the first wellbore and an adjacent wellbore can be decreased as compared to an original fluid communication between the first wellbore and the adjacent wellbore before injection of the sealant composition. In some embodiments, pressure connectivity between the first wellbore and an adjacent wellbore can be decreased as compared to an original pressure connectivity between the first wellbore and the adjacent wellbore before injection of the sealant composition. In some embodiments, the adjacent wellbore may be at least 100 feet (e.g., at least 200 feet, at least 300 feet, at least 400 feet, at least 500 feet, at least 1000 feet, at least 1500 feet, at least 2000 feet, at least 2500 feet, at least 3000 feet, at least 3500 feet, at least 4000 feet, at least 4500 feet, at least 5000 feet, at least 5500 feet, at least 6000 feet, at least 6500 feet, at least 7000 feet, at least 7500 feet, at least 8000 feet, at least 8500 feet, at least 9000 feet, at least 9500 feet, or at least 10,000 feet) away from the first wellbore. In some embodiments, the adjacent wellbore may be up to 10,000 feet (e.g., up to 9500 feet, up to 9000 feet, up to 8500 feet, up to 8000 feet, up to 7500 feet, up to 7000 feet, up to 6500 feet, up to 6000 feet, up to 5500 feet, up to 5000 feet, up to 4500 feet, up to 4000 feet, up to 3500 feet, up to 3000 feet, up to 2500 feet, up to 2000 feet, up to 1500 feet, up to 1000 feet, up to 900 feet, up to 800 feet, up to 700 feet, up to 600 feet, up to 500 feet, up to 400 feet, up to 300 feet, up to 200 feet, or up to 100 feet) away from the first wellbore.

The adjacent wellbore can be any distance from the first wellbore ranging from any of the minimum values described above to any of the maximum values described above. For example, in some embodiments, the adjacent wellbore can be from 100 feet to 10,000 feet (e.g., from 200 feet to 9500 feet, from 300 feet to 9000 feet, from 400 feet to 8500 feet, from 500 feet to 8000 feet, from 600 feet to 7500 feet, from 700 feet to 7000 feet, from 800 feet to 6500 feet, from 900 feet to 6000 feet, from 1000 feet to 5500 feet, from 1500 feet to 5000 feet, from 2000 feet to 4500 feet, from 2500 feet to 4000 feet, from 3000 feet to 3500 feet, from 100 feet to 3500 feet, from 200 feet to 3000 feet, from 300 feet to 2500 feet, from 400 feet to 2000 feet, from 500 feet to 1500 feet, from 600 feet to 1000 feet, from 700 feet to 900 feet, from 3000 feet to 10,000 feet, from 3500 feet to 9000 feet, from 4000 feet to 8500 feet, from 4500 feet to 8000 feet, from 5000 feet to 7500 feet, from 5500 feet to 7000 feet, or from 6000 feet to 6500 feet) away from the first wellbore.

In some embodiments, upon injection of a tracer into the first wellbore, an amount of said tracer detected in the adjacent wellbore can be decreased by at least 40% (e.g., by at least 45%, by at least 50%, by at least 55%, by at least 60%, by at least 65%, by at least 70%, by at least 75%, by at least 80%, by at least 85%, by at least 90%, or by at least 95%) as compared to an original amount of said tracer detected in the adjacent wellbore before injection of the sealant composition. In some embodiments, upon injection of a tracer into the first wellbore, an amount of said tracer detected in the adjacent wellbore can be decreased by 95% or less (e.g., by 90% or less, by 85% or less, by 80% or less, by 75% or less, by 70% or less, by 65% or less, by 60% or less, by 55% or less, by 50% or less, by 45% or less, or by 40% or less) as compared to an original amount of said tracer detected in the adjacent wellbore before injection of the sealant composition.

Upon injection of a tracer into the first wellbore, an amount of said tracer detected in the adjacent wellbore can be decreased by an amount ranging from any of the minimum values described above to any of the maximum values described above as compared to an original amount of said tracer detected in the adjacent wellbore before injection of the sealant composition. For example, in some embodiments, upon injection of a tracer into the first wellbore, an amount of said tracer detected in the adjacent wellbore can be decreased by from 40% to 90% (e.g., from 45% to 85%, from 50% to 80%, from 55% to 75%, from 60% to 70%, from 40% to 65%, from 45% to 60%, from 50% to 55%, from 65% to 80%, or from 70% to 75%) as compared to an original amount of said tracer detected in the adjacent wellbore before injection of the sealant composition.

In some embodiments, upon application of a first pressure to the first wellbore, a second pressure detected in the adjacent wellbore can be decreased by at least 40% (e.g., at least 45%, at least 50%, at least 55%, at least 60%, at least 65%, at least 70%, at least 75%, at least 80%, at least 85%, at least 90%, or at least 95%) as compared to an original second pressure detected in the adjacent wellbore before injection of the sealant composition. In some embodiments, upon application of a first pressure to the first wellbore, a second pressure detected in the adjacent wellbore can be decreased by 95% or less (e.g., 90% or less, 85% or less, 80% or less, 75% or less, 70% or less, 65% or less, 60% or less, 55% or less, 50% or less, 45% or less, or 40% or less) as compared to an original second pressure detected in the adjacent wellbore before injection of the sealant composition.

Upon application of a first pressure to the first wellbore, a second pressure detected in the adjacent wellbore can be decreased by an amount ranging from any of the minimum values described above to any of the maximum values described above as compared to an original second pressure detected in the adjacent wellbore before injection of the sealant composition. For example, in some embodiments, upon application of a first pressure to the first wellbore, a second pressure detected in the adjacent wellbore can be decreased by from 40% to 90% (e.g., from 45% to 85%, from 50% to 80%, from 55% to 75%, from 60% to 70%, from 40% to 65%, from 45% to 60%, from 50% to 55%, from 65% to 80%, or from 70% to 75%) as compared to an original second pressure detected in the adjacent wellbore before injection of the sealant composition.

In some embodiments, permeability of the closed fracture can be decreased as compared to an original permeability of the fracture before injection of the sealant composition. In some embodiments, permeability of the closed fracture can be decreased by at least 50% (e.g., at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, or at least 99%). In some embodiments, permeability of the closed fracture can be decreased by 99% or less (e.g., at least 98% or less, at least 97% or less, at least 96% or less, at least 95% or less, at least 94% or less, at least 93% or less, at least 92% or less, at least 91% or less, at least 90% or less, 85% or less, 80% or less, 75% or less, 70% or less, 65% or less, 60% or less, 55% or less, or 50% or less).

Permeability of the closed fracture can be decreased by an amount ranging from any of the minimum values described above to any of the maximum values described above. For example, in some embodiments, the permeability of the closed fracture can be decreased by from 50% to 99% (e.g., from 55% to 98%, from 60% to 97%, from 65% to 96%, from 70% to 95%, from 75% to 94%, from 80% to 93%, from 85% to 92%, from 90% to 91%, from 50% to 90%, from 55% to 85%, from 60% to 80%, from 65% to 75%, from 90% to 99%, from 91% to 98%, from 92% to 97%, from 93% to 96%, from 94% to 95%, from 55% to 99%, from 60% to 99%, from 65% to 99%, from 70% to 99%, from 75% to 99%, from 80% to 99%, from 85% to 99%, from 90% to 99%, from 91% to 99%, from 92% to 99%, from 93% to 99%, from 94% to 99%, from 95% to 99%, from 96% to 99%, from 97% to 99%, or from 98% to 99%).

In some embodiments, permeability of the first region of the unconventional subterranean formation can be decreased by at least 2 orders of magnitude (e.g., at least 3 orders of magnitude, at least 4 orders of magnitude, at least 5 orders of magnitude, or at least 6 orders of magnitude). In some embodiments, permeability of the first region of the unconventional subterranean formation can be decreased by up to 6 orders of magnitude (e.g., up to 5 orders of magnitude, up to 4 orders of magnitude, up to 3 orders of magnitude, or up to 2 orders of magnitude).

Permeability of the first region of the unconventional subterranean formation can be decreased by an amount ranging from any of the minimum values described above to any of the maximum values described above. For example, in some embodiments, permeability of the first region of the unconventional subterranean formation can be decreased by 2 orders of magnitude to 6 orders of magnitude (e.g., from 3 orders of magnitude to 5 orders of magnitude, from 2 orders of magnitude to 4 orders of magnitude, or from 4 orders of magnitude to 6 orders of magnitude).

In some embodiments, permeability of the closed fracture can be decreased to a level below an original permeability of the unconventional subterranean formation.

In some embodiments, the methods for fracture sealing and redevelopment can further include injecting a fracturing fluid through the first wellbore. In some embodiments, the fracturing fluid can be a dispersing fracture fluid. Dispersing fracture fluids are those which include aqueous solutions of monovalent cation salts, including organic sulfates, phosphates, chlorides, fluorides, citrates, acetates, tartrates, hydrogen phosphates or a mixture thereof. A dispersing fracture solution in the fracture zone will disperse clays and other earthen particles and allow them to be carried by the flow-back fluids out of the hydrocarbon producing fracture zone. This process increases hydrocarbon production when the pay zone does not contain a lot of clay. In some embodiments, the fracturing fluid can be an aggregating fracture fluid. Aggregating fracture fluids are those which include aqueous solutions of di- and trivalent cation salts, e.g., calcium chloride ($CaCl_2$)), iron chloride ($FeCl_3$), magnesium chloride ($MgCl_2$), di- and trivalent metal salts of carboxylic acids. An aggregating fracture solution will aggregate and bind clays and other earthen materials. This stabilizes the fracture zone but will eventually clog and occlude the pay zone with the clay particles that are not aggregated by the cation salts.

In some embodiments, the methods for fracture sealing and redevelopment can further include injecting a fracturing fluid through a second wellbore. In some embodiments, the second wellbore can be preexisting. In some embodiments, the second wellbore can be from a previous fracturing operation. In some embodiments, the second wellbore can be a new wellbore. In some embodiments, the second wellbore can be from a previous fracturing operation. In some embodiments, the second wellbore can include a horizontal portion and/or a vertical portion. In some embodiments, the second wellbore can include a diagonal portion. In some embodiments, the second wellbore can be a sidetrack wellbore coming off of the first wellbore. In some embodiments, the second wellbore can be an infill wellbore coming off of the first wellbore.

In some embodiments, the second wellbore can be separated from the first wellbore. In some embodiments, the second wellbore may be at least 100 feet (e.g., at least 200 feet, at least 300 feet, at least 400 feet, at least 500 feet, at least 1000 feet, at least 1500 feet, at least 2000 feet, at least 2500 feet, at least 3000 feet, at least 3500 feet, at least 4000 feet, at least 4500 feet, at least 5000 feet, at least 5500 feet, at least 6000 feet, at least 6500 feet, at least 7000 feet, at least 7500 feet, at least 8000 feet, at least 8500 feet, at least 9000 feet, at least 9500 feet, or at least 10,000 feet) away from the first wellbore. In some embodiments, the second wellbore may be up to 10,000 feet (e.g., up to 9500 feet, up to 9000 feet, up to 8500 feet, up to 8000 feet, up to 7500 feet, up to 7000 feet, up to 6500 feet, up to 6000 feet, up to 5500 feet, up to 5000 feet, up to 4500 feet, up to 4000 feet, up to 3500 feet, up to 3000 feet, up to 2500 feet, up to 2000 feet, up to 1500 feet, up to 1000 feet, up to 900 feet, up to 800 feet, up to 700 feet, up to 600 feet, up to 500 feet, up to 400 feet, up to 300 feet, up to 200 feet, or up to 100 feet) away from the first wellbore.

The second wellbore can be any distance from the first wellbore ranging from any of the minimum values described above to any of the maximum values described above. For example, in some embodiments, the second wellbore can be from 100 feet to 10,000 feet (e.g., from 200 feet to 9500 feet, from 300 feet to 9000 feet, from 400 feet to 8500 feet, from 500 feet to 8000 feet, from 600 feet to 7500 feet, from 700 feet to 7000 feet, from 800 feet to 6500 feet, from 900 feet to 6000 feet, from 1000 feet to 5500 feet, from 1500 feet to 5000 feet, from 2000 feet to 4500 feet, from 2500 feet to 4000 feet, from 3000 feet to 3500 feet, from 100 feet to 3500 feet, from 200 feet to 3000 feet, from 300 feet to 2500 feet, from 400 feet to 2000 feet, from 500 feet to 1500 feet, from 600 feet to 1000 feet, from 700 feet to 900 feet, from 3000 feet to 10,000 feet, from 3500 feet to 9000 feet, from 4000 feet to 8500 feet, from 4500 feet to 8000 feet, from 5000 feet to 7500 feet, from 5500 feet to 7000 feet, or from 6000 feet to 6500 feet) away from the first wellbore.

In some embodiments, the fracturing fluid can be injected at a pressure and flow rate effective to form a fracture in a second region of the unconventional subterranean formation. In some embodiments, the second region of the unconventional subterranean formation may be unfractured or underfractured. A region may be said to be underfractured when the production from the region is lower than forecasted for that region or lower relative to the original or first well's production.

In some embodiments, the second region of the unconventional subterranean formation can be disposed above or below the first region of the unconventional subterranean formation. In some embodiments, the second region of the unconventional subterranean formation can be disposed at the same level as the first region of the unconventional subterranean formation at any horizontal position around the first region of the unconventional subterranean formation. In some embodiments, the second region of the unconventional subterranean formation can be disposed diagonal to the first region of the unconventional subterranean formation. In some embodiments, the second region of the unconventional subterranean formation can be immediately adjacent to the first region of the unconventional subterranean formation. In some embodiments, the second region of the unconventional subterranean formation can be spaced from the first region of the unconventional subterranean formation.

In some embodiments, when solidified, the sealant composition can reduce the formation of fractures in the first region of the unconventional subterranean formation. In some embodiments, the fracturing fluid can form a new fracture in the second region of the unconventional subterranean formation at a lower injection pressure and/or flow rate than the injection pressure/flow rate required to form a new fracture in the first region of the unconventional subterranean formation due to the presence of the solidified sealant composition in the first region of the unconventional subterranean formation. In some embodiments, the solidified sealant composition can impact a direction, a geometry, or any combination thereof of new fractures. For example, the solidified sealant composition can direct fracture formation away from the first region of the unconventional subterranean formation and towards virgin rock.

In some embodiments, the methods for fracture sealing and redevelopment can further include producing fluids (e.g., hydrocarbons) from the first wellbore and/or the second wellbore.

Figure 2:
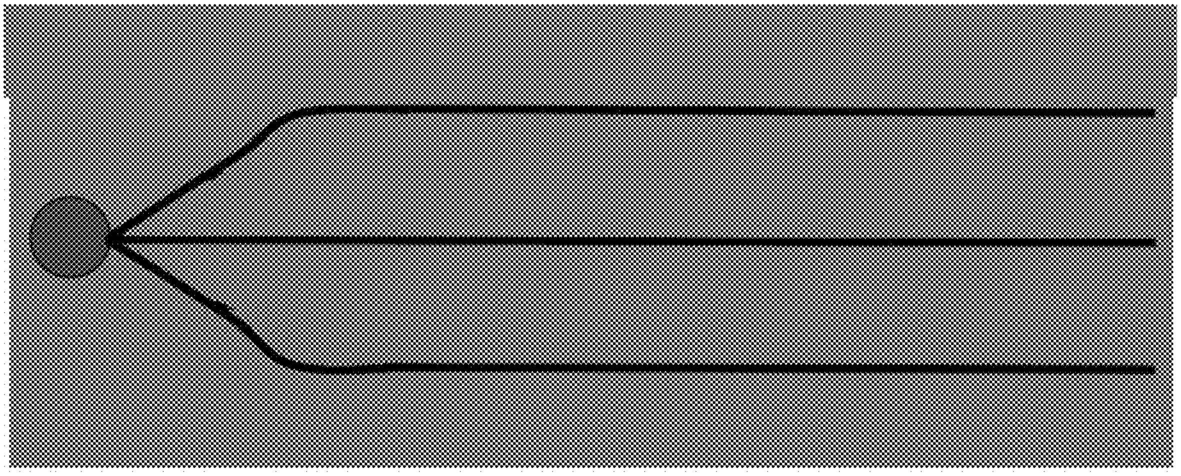
FIG. 2 depicts an example method of fracture sealing and redevelopment using sidetrack or infill lateral wellbores as described herein.
Figure 3A:
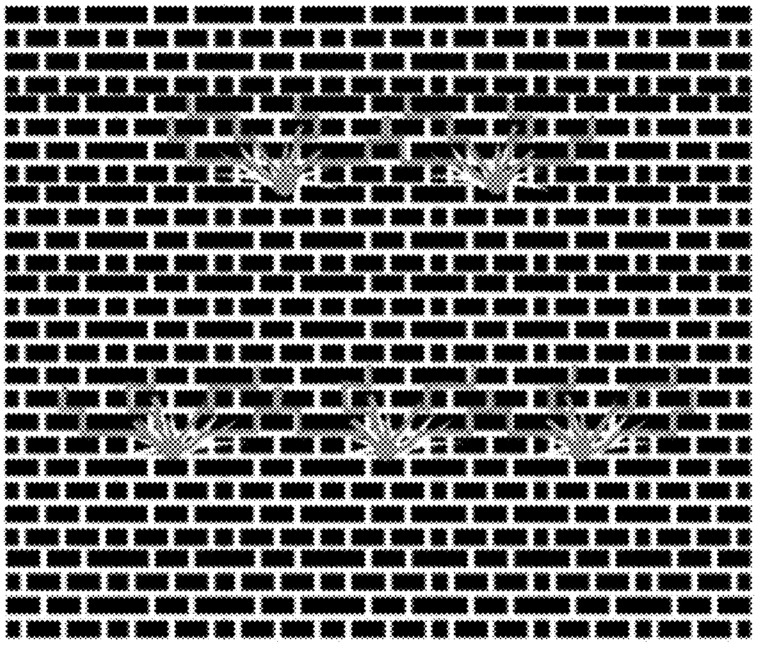
FIGS. 3A-3B depict a cross-sectional view of an example method as in FIG. 2.
Figure 3B:
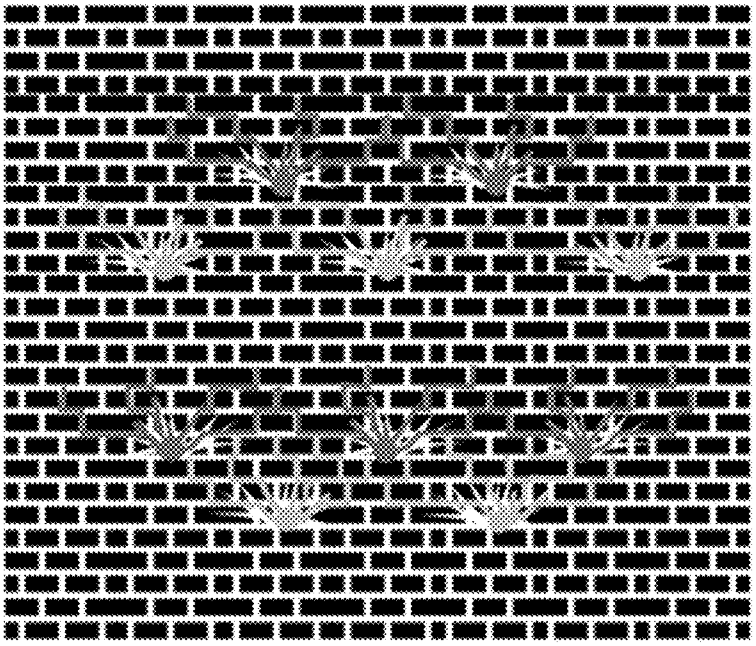

An example of such an embodiment of the method is shown in FIGS. 1A-1D. A first wellbore is drilled (FIG. 1A) and fractured (FIG. 1B) and hydrocarbons are produced therefrom. The sealant composition is then injected through the wellbore such that it enters the fracture (FIG. 1C) where it solidifies. After sufficient solidification, a fracturing fluid can be injected into the wellbore, thereby producing a fracture in a region of the unconventional subterranean formation that has not previously been fractured. In some embodiments, the fracturing fluid is injected through the same wellbore as the sealant composition. In other embodiments, a second wellbore, more particularly a sidetrack or infill lateral wellbore is drilled as shown in FIG. 2. The fracturing fluid is then injected through the sidetrack or infill lateral wellbore, thereby fracturing a region of the unconventional subterranean formation in fluid communication with said sidetrack or infill lateral wellbore. A cross-sectional view of an embodiment using sidetrack or infill lateral wellbores is shown in FIGS. 3A-3B. The initial fractures (FIG. 3A) are sealed, thereby constricting the available pathways of new fractures to previously unfractured regions of the unconventional subterranean formation (FIG. 3B).

In some embodiments, the methods for fracture sealing and redevelopment can further include injecting an etching agent through the first wellbore, thereby at least partially removing the solidified sealant composition. In some embodiments, the etching agent can dissolve the solidified sealant composition. In some embodiments, the etching agent can chemically degrade the solidified sealant composition, for example, by cleaving bonds between molecules of the sealant composition (e.g., crosslinkers). In some embodiments, the sealant composition can be contacted with the etching agent and at least partially fluidized. In some embodiments, the fluidized sealant composition can be removed from the fracture, for example, by flowing or pumping it back out of the wellbore.

In some embodiments, the etching agent can include a strong acid. Examples of strong acids include hydrochloric acid, sulfuric acid, nitric acid, hydrobromic acid, chloric acid, and perchloric acid. In some embodiments, the etching agent can include a strong base. Examples of strong bases include lithium hydroxide, sodium hydroxide, potassium hydroxide, and calcium hydroxide. In some embodiments, the etching agent can include an enzyme which can cleave bonds between molecules of the sealant composition.

In some embodiments, injection of the etching agent can increase fluid flow through the fracture in the first region of in the unconventional subterranean formation.

In some embodiments, the solidified sealant composition can be retained in the closed fracture. In some embodiments, the solidified sealant composition can be retained in the closed fracture for at least 1 year (e.g., at least 2 years, at least 5 years, at least 10 years, at least 15 years, at least 20 years, at least 30 years, at least 40 years, at least 50 years, or at least 100 years). In some embodiments, the solidified sealant composition can be retained in the closed fracture for 100 years or less (e.g., 50 years or less, 40 years or less, 30 years or less, 20 years or less, 15 years or less, 10 years or less, 5 years or less, 2 years or less, or 1 year or less).

The solidified sealant composition can be retained in the closed fracture for a duration ranging from any of the minimum values described above to any of the maximum values described above. For example, in some embodiments, the solidified sealant composition can be retained in the closed fracture for from 1 year to 100 years (e.g., from 2 years to 50 years, from 5 years to 40 years, from 10 years to 30 years, from 15 years to 20 years, from 1 year to 20 years, from 2 years to 15 years, from 5 years to 10 years, from 15 years to 100 years, from 20 years to 50 years, or from 30 years to 40 years). In other embodiments, the solidified sealant composition can be retained in the closed fracture for greater than 100 years. In yet other embodiments, the solidified sealant composition can be retained in the closed fracture indefinitely.

In some embodiments, the step of injecting the sealant composition through a first wellbore can further include injecting carbon dioxide through the first wellbore, and, when solidified, the sealant composition can trap the carbon dioxide in the fracture. For example, in some embodiments, carbon dioxide can be injected through the first wellbore before injection of the sealant composition. Additionally, or alternatively, in other such embodiments, the carbon dioxide can be bubbled through the injected sealant composition (e.g., before solidification of the sealant composition).

In some aspects, the solidified sealant composition can be retained in the closed fracture, thereby storing carbon dioxide in the at least one fracture. In some embodiments, the solidified sealant composition can be retained in the closed fracture for at least 1 year (e.g., at least 2 years, at least 5 years, at least 10 years, at least 15 years, at least 20 years, at least 30 years, at least 40 years, at least 50 years, or at least 100 years). In some embodiments, the solidified sealant composition can be retained in the closed fracture for 100 years or less (e.g., 50 years or less, 40 years or less, 30 years or less, 20 years or less, 15 years or less, 10 years or less, 5 years or less, 2 years or less, or 1 year or less).

The solidified sealant composition can be retained in the closed fracture for a duration ranging from any of the minimum values described above to any of the maximum values described above. For example, in some embodiments, the solidified sealant composition can be retained in the closed fracture for from 1 year to 100 years (e.g., from 2 years to 50 years, from 5 years to 40 years, from 10 years to 30 years, from 15 years to 20 years, from 1 year to 20 years, from 2 years to 15 years, from 5 years to 10 years, from 15 years to 100 years, from 20 years to 50 years, or from 30 years to 40 years). In other embodiments, the solidified sealant composition can be retained in the closed fracture for greater than 100 years. In yet other embodiments, the solidified sealant composition can be retained in the closed fracture indefinitely.

Figure 4:
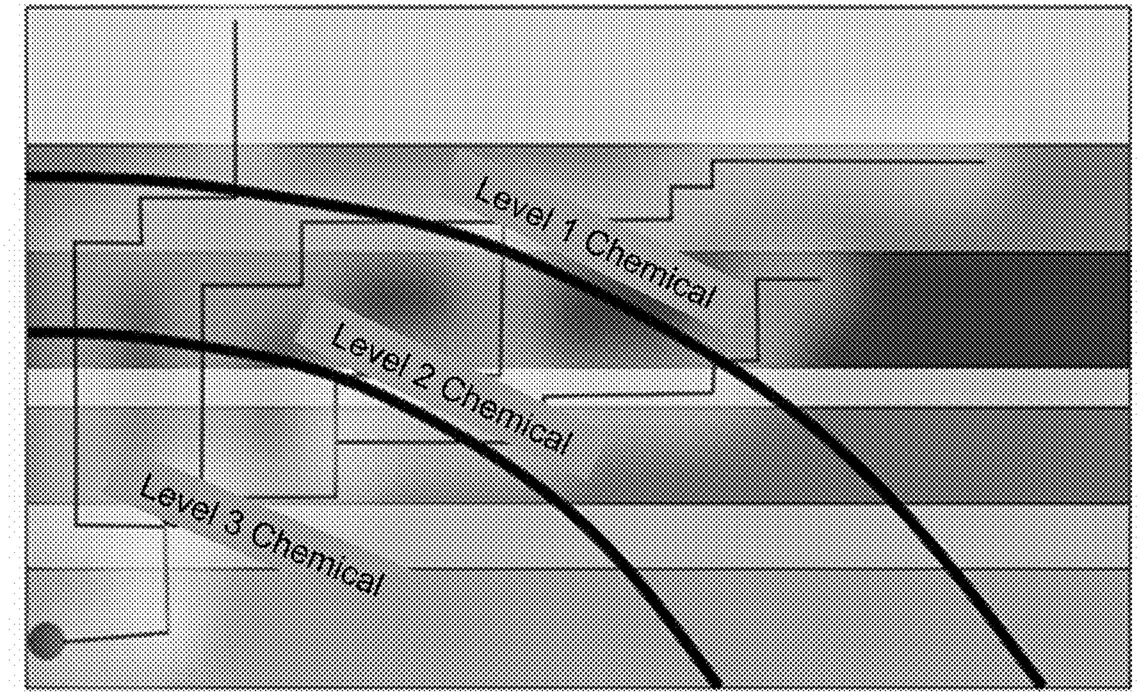
FIG. 4 illustrates the sequential injection of a plurality of sealant compositions through a wellbore.

In some embodiments, the step of injecting the sealant composition through a first wellbore further can include sequentially injecting a plurality of sealant compositions having through the first wellbore. Such a method may include sequential injections (levels) utilizing sealant compositions of varying viscosity and mechanical strength (e.g., when cured). This process can be used for one, some, or all wellbores present within a depleted development section. Secondary wellbores can then be drilled in locations that would have the best estimated probability to be intersecting previously unconnected and undepleted reservoir. The rates and pressures of injection of the sealant composition(s) can be selected such that they are sufficient to push the sealant composition(s) into the connected fracture system present in the reservoir. These sealant compositions can solidify, 'cementing' or closing off the connected fractures that allowed for flow to existing wellbores. For example, as illustrated in FIG. 4, in some embodiments, such a method can include (i) injecting a first sealant composition through the first wellbore; (ii) injecting a second sealant composition through the first wellbore; and (iii) injecting a third sealant composition through the first wellbore. Each of the first sealant composition, the second sealant composition, and the third sealant composition can solidify in the fracture, thereby closing the fracture.

In some embodiments, the step of injecting the sealant composition through a first wellbore further can include sequentially injecting a plurality of sealant compositions having increasing viscosity through the first wellbore. For example, in some embodiments, such a method can include (i) injecting a first sealant composition having a first viscosity through the first wellbore; (ii) injecting a second sealant composition having a second viscosity through the first wellbore; and (iii) injecting a third sealant composition having a third viscosity through the first wellbore. Each of the first sealant composition, the second sealant composition, and the third sealant composition can solidify in the fracture, thereby closing the fracture.

In some embodiments, the second viscosity can be greater than the first viscosity by at least 10% (e.g., at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 100%, at least 105%, at least 110%, at least 115%, at least 120%, at least 125%, at least 130%, at least 135%, at least 140%, at least 145%, or at least 150%). In some embodiments, the second viscosity can be greater than the first viscosity by 150% or less (e.g., 145% or less, 140% or less, 135% or less, 130% or less, 125% or less, 120% or less, 115% or less, 110% or less, 105% or less, 100% or less, 95% or less, 90% or less, 85% or less, 80% or less, 75% or less, 70% or less, 65% or less, 60% or less, 55% or less, 50% or less, 45% or less, 40% or less, 35% or less, 30% or less, 25% or less, 20% or less, 15% or less, or 10% or less).

The second viscosity can be greater than the first viscosity by an amount ranging from any of the minimum values described above to any of the maximum values described above. For example, the second viscosity can be greater than the first viscosity by from 10% to 150% (e.g., from 15% to 145%, from 20% to 140%, from 25% to 135%, from 30% to 130%, from 35% to 125%, from 40% to 120%, from 45% to 115%, from 50% to 110%, from 55% to 105%, from 60% to 100%, from 65% to 95%, from 70% to 90%, from 75% to 85%, from 10% to 80%, from 15% to 75%, from 20% to 70%, from 25% to 65%, from 30% to 60%, from 35% to 55%, from 40% to 50%, from 80% to 150%, from 85% to 145%, from 90% to 140%, from 95% to 135%, from 100% to 130%, from 105% to 125%, or from 110% to 120%).

In some embodiments, the third viscosity can be greater than the second viscosity by at least 10% (e.g., at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 100%, at least 105%, at least 110%, at least 115%, at least 120%, at least 125%, at least 130%, at least 135%, at least 140%, at least 145%, or at least 150%). In some embodiments, the third viscosity can be greater than the second viscosity by 150% or less (e.g., 145% or less, 140% or less, 135% or less, 130% or less, 125% or less, 120% or less, 115% or less, 110% or less, 105% or less, 100% or less, 95% or less, 90% or less, 85% or less, 80% or less, 75% or less, 70% or less, 65% or less, 60% or less, 55% or less, 50% or less, 45% or less, 40% or less, 35% or less, 30% or less, 25% or less, 20% or less, 15% or less, or 10% or less).

The third viscosity can be greater than the second viscosity by an amount ranging from any of the minimum values described above to any of the maximum values described above. For example, the third viscosity can be greater than the second viscosity by from 10% to 150% (e.g., from 15% to 145%, from 20% to 140%, from 25% to 135%, from 30% to 130%, from 35% to 125%, from 40% to 120%, from 45% to 115%, from 50% to 110%, from 55% to 105%, from 60% to 100%, from 65% to 95%, from 70% to 90%, from 75% to 85%, from 10% to 80%, from 15% to 75%, from 20% to 70%, from 25% to 65%, from 30% to 60%, from 35% to 55%, from 40% to 50%, from 80% to 150%, from 85% to 145%, from 90% to 140%, from 95% to 135%, from 100% to 130%, from 105% to 125%, or from 110% to 120%).

In some embodiments, each sealant composition can extend substantially concentrically into the unconventional subterranean formation from the first wellbore, and injection of each sealant composition can push already-injected sealant compositions further into the fracture. In some embodiments, a chaser can be injected after injection after any one or more of the sealant compositions, thereby pushing the one or more sealant compositions further into the fracture.

Further, while embodiments are generally discussed herein referencing a single first wellbore and/or a single second wellbore, one of ordinary skill in the art will understand that the methods described herein apply to circumstances which include a plurality of wellbores through which the sealant composition is injected and/or a plurality of wellbores through which the fracturing fluid is injected.

Sealant Compositions

The sealant composition can comprise any suitable material which can be injected to seal a fracture.

In some embodiments, the sealant composition can be an inorganic gel. In some embodiments, inorganic gel can include a plurality of nanoparticles. For example, in some embodiments, said nanoparticles can include silica, alumina, aluminosilicates, or any combination thereof. The inorganic gel can start out as a low viscosity "sol" solution, wherein the nanoparticles remain suspended in the solution. Altering the solution, for example, via a pH change, can cause the nanoparticles to "gel" to solidify, forming a rubbery sealant. In some embodiments, the solidified inorganic gel can have a breakthrough pressure limit of greater than 200 psi (e.g., greater than 225 psi, greater than 250 psi, greater than 275 psi, greater than 300 psi, greater than 325 psi, greater than 350 psi, greater than 375 psi, greater than 400 psi, greater than 425 psi, greater than 450 psi, greater than 475 psi, greater than 500 psi). In some embodiments, the solidified inorganic gel can have a breakthrough pressure limit of 500 psi or less (e.g., 475 psi or less, 450 psi or less, 425 psi or less, 400 psi or less, 375 psi or less, 350 psi or less, 325 psi or less, 300 psi or less, 275 psi or less, 250 psi or less, 225 psi or less, or 200 psi or less).

The solidified inorganic gel can have a breakthrough pressure limit ranging from any of the minimum values described above to any of the maximum values described above. For example, the solidified inorganic gel can have a breakthrough pressure limit of from 200 psi to 500 psi (e.g., from 225 psi to 475 psi, from 250 psi to 450 psi, from 275 psi to 425 psi, from 300 psi to 400 psi, from 325 psi to 375 psi, from 200 psi to 350 psi, from 225 psi to 325 psi, from 275 psi to 300 psi, from 350 psi to 500 psi, from 375 psi to 475 psi, or from 400 psi to 450 psi).

In some embodiments, the nanoparticles can have a diameter of at least 50 nm (e.g., at least 60 nm, at least 70 nm, at least 80 nm, at least 90 nm, at least 100 nm, at least 110 nm, at least 120 nm, at least 120 nm, at least 130 nm, at least 140 nm, at least 150 nm, at least 160 nm, at least 170 nm, at least 180 nm, at least 190 nm, at least 200 nm, at least 210 nm, at least 220 nm, at least 230 nm, at least 240 nm, at least 250 nm, at least 260 nm, at least 270 nm, at least 280 nm, at least 290 nm, or at least 300 nm). In some embodiments, the nanoparticles can have a diameter of 300 nm or less (e.g., 290 nm or less, 280 nm or less, 270 nm or less, 260 nm or less, 250 nm or less, 240 nm or less, 230 nm or less, 220 nm or less, 210 nm or less, 200 nm or less, 190 nm or less, 180 nm, 170 nm or less, 160 nm or less, 150 nm or less, 140 nm or less, 130 nm or less, 120 nm or less, 110 nm or less, 100 nm or less, 90 nm or less, 80 nm or less, 70 nm or less, 60 nm or less, or 50 nm or less).

The nanoparticles can have a diameter ranging from any of the minimum values described above to any of the maximum values described above. For example, the nanoparticles can have a diameter of from 50 nm to 300 nm (e.g., from 60 nm to 290 nm, from 70 nm to 280 nm, from 80 nm to 270 nm, from 90 nm to 260 nm, from 100 nm to 250 nm, from 110 nm to 240 nm, from 120 nm to 230 nm, from 130 nm to 220 nm, from 140 nm to 210 nm, from 150 nm to 200 nm, from 160 nm to 190 nm, from 170 nm to 180 nm, from 50 nm to 180 nm, from 60 nm to 170 nm, from 70 nm to 160 nm, from 80 nm to 150 nm, from 90 nm to 140 nm, from 100 nm to 130 nm, from 110 nm to 120 nm, from 170 nm to 300 nm, from 180 nm to 290 nm, from 190 nm to 280 nm, from 200 nm to 270 nm, from 210 nm to 280 nm, from 220 nm to 290 nm, from 230 nm to 280 nm, from 240 nm to 270 nm, or from 250 nm to 260 nm).

In some embodiments, the inorganic gel can have a solids content of at least 1% (e.g., at least 2%, at least 3%, at least 4%, at least 5%, at least 6%, at least 79%, at least 8%, at least 9%, at least 10%, at least 11%, at least 12%, at least 13%, at least 14%, or at least 15%). In some embodiments, the inorganic gel can have a solids content of 15% or less (e.g., 14% or less, 13% or less, 12% or less, 11% or less, 10% or less, 9% or less, 8% or less, 7% or less, 6% or less, 5% or less, 4% or less, 3% or less, 2% or less, or 1% or less).

The inorganic gel can have a solids content in an amount ranging from any of the minimum values described above to any of the maximum values described above. For example, the inorganic gel can have a solids content from 1% to 15% (e.g., from 2% to 14%, from 3% to 139%, from 4% to 12%, from 5% to 11%, from 6% to 10%, from 7% to 9%, from 1% to 8%, from 2% to 7%, from 3% to 6%, from 4% to 5%, from 8% to 15%, from 9% to 14%, or from 10% to 13%).

In some embodiments, the inorganic gel can include one or more stabilizing agents. Examples of stabilizing agents can include, but are not limited to ammonium, citrate, sodium gluconate, polyvinylpyrrolidone, vinylpyrrolidone, and polyoxyethylene. In some embodiments, the inorganic gel can be water-based.

In some embodiments, the inorganic gel can solidify via the injection of a pH altering agent. In some embodiments, the pH altering agent can be a base. In some embodiments, the base can have a pH of at least 8 (e.g., at least 8.2, at least 8.4, at least 8.6, at least 8.8, at least 9, at least 9.2, at least 9.4, at least 9.6, at least 9.8, at least 10, at least 10.2, at least 10.4, at least 10.6, at least 10.8, or at least 11). In some embodiments, the base can have a pH of 11 or less (e.g., 10.8 or less, 10.6 or less, 10.4 or less, 10.2 or less, 10 or less, 9.8 or less, 9.6 or less, 9.4 or less, 9.2 or less, 9 or less, 8.8 or less, 8.6 or less, 8.4 or less, 8.2 or less, or 8 or less).

The base can have a pH ranging from any of the minimum values described above to any of the maximum values described above. For example, the base can have a pH of from 8 to 11 (e.g., from 8.2 to 10.8, from 8.4 to 10.6, from 8.6 to 10.4, from 8.8 to 10.2, from 9 to 10, from 9.2 to 9.8, from 9.4 to 9.6, from 8 to 9.6, from 8.2 to 9.4, from 8.4 to 9.2, from 8.6 to 9, from 9.4 to 11, from 9.6 to 10.8, from 9.8 to 10.6, or from 10 to 10.4).

In some embodiments, the pH altering agent can be an acid. In some embodiments, the acid can have a pH of at least 3 (e.g., at least 3.2, at least 3.4, at least 3.6, at least 3.8, at least 4, at least 4.2, at least 4.4, at least 4.6, at least 4.8, at least 5, at least 5.2, at least 5.4, at least 5.6, at least 5.8, at least 6). In some embodiments, the acid can have a pH of 6 or less (e.g., 5.8 or less, 5.6 or less, 5.4 or less, 5.2 or less, 5 or less, 4.8 or less, 4.6 or less, 4.4 or less, 4.2 or less, 4 or less, 3.8 or less, 3.6 or less, 3.4 or less, 3.2 or less, or 3 or less).

The acid can have a pH ranging from any of the minimum values described above to any of the maximum values described above. For example, the acid can have a pH of from 3 to 6 (e.g., from 3.2 to 5.8, from 3.4 to 5.6, from 3.6 to 5.4, from 3.8 to 5.2, from 4 to 5, from 4.2 to 4.8, from 4.4 to 4.6, from 3 to 4.6, from 3.2 to 4.4, from 3.4 to 4.2, from 3.6 to 4, from 4.4 to 6, from 4.6 to 5.8, from 4.8 to 5.6, or from 5 to 5.4).

In some embodiments, the inorganic gel can include urea and the pH altering agent can include urease, and the urease can decompose the urea into carbon dioxide, thereby decreasing pH. In some embodiments, the urea is a byproduct of another operation, for example, manufacturing or agriculture. In some embodiments, the urease can be expressed by a microbe. In some embodiments, the pH altering agent can include the microbe expressing the urease. In some embodiments, the pH altering agent can include the urease extracted from the microbe.

In some embodiments, the pH can decrease to at least 3 (e.g., at least 3.2, at least 3.4, at least 3.6, at least 3.8, at least 4, at least 4.2, at least 4.4, at least 4.6, at least 4.8, at least 5, at least 5.2, at least 5.4, at least 5.6, at least 5.8, or at least 6). In some embodiments, the pH can decrease to 6 or less (e.g., 5.8 or less, 5.6 or less, 5.4 or less, 5.2 or less, 5 or less, 4.8 or less, 4.6 or less, 4.4 or less, 4.2 or less, 4 or less, 3.8 or less, 3.6 or less, 3.4 or less, 3.2 or less, or 3 or less).

The pH can decrease to an amount ranging from any of the minimum values described above to any of the maximum values described above. For example, the pH can decrease to from 3 to 6 (e.g., from 3.2 to 5.8, from 3.4 to 5.6, from 3.6 to 5.4, from 3.8 to 5.2, from 4 to 5, from 4.2 to 4.8, from 4.4 to 4.6, from 3 to 4.6, from 3.2 to 4.4, from 3.4 to 4.2, from 3.6 to 4, from 4.4 to 6, from 4.6 to 5.8, from 4.8 to 5.6, or from 5 to 5.4).

In some embodiments, the solidified inorganic gel can be retained in the closed fracture, thereby storing carbon dioxide in the closed fracture. In some embodiments, the solidified inorganic gel can be retained in the closed fracture for at least 1 year (e.g., at least 2 years, at least 5 years, at least 10 years, at least 15 years, at least 20 years, at least 30 years, at least 40 years, at least 50 years, or at least 100 years). In some embodiments, the solidified inorganic gel can be retained in the closed fracture for 100 years or less (e.g., 50 years or less, 40 years or less, 30 years or less, 20 years or less, 15 years or less, 10 years or less, 5 years or less, 2 years or less, or 1 year or less).

The solidified inorganic gel can be retained in the closed fracture for a duration ranging from any of the minimum values described above to any of the maximum values described above. For example, in some embodiments, the solidified inorganic gel can be retained in the closed fracture for from 1 year to 100 years (e.g., from 2 years to 50 years, from 5 years to 40 years, from 10 years to 30 years, from 15 years to 20 years, from 1 year to 20 years, from 2 years to 15 years, from 5 years to 10 years, from 15 years to 100 years, from 20 years to 50 years, or from 30 years to 40 years). In some embodiments, the solidified inorganic gel can be retained in the closed fracture for greater than 100 years. In some embodiments, the solidified inorganic gel can be retained in the closed fracture indefinitely.

In some embodiments, the sealant composition can be an organic polymer gel. In some embodiments, the organic polymer gel can be water-based. In some embodiments, the organic polymer gel can solidify via the injection of a crosslinker. Crosslinkers are known in the art, and a suitable crosslinker could be selected by one of ordinary skill in the art.

In some embodiments, said crosslinker can be carbon dioxide based. Examples of carbon dioxide-based cross-linkers include carbonates (e.g., alkyl carbonates, ether carbonates).

In some embodiments, the solidified organic polymer gel can be retained in the closed fracture, thereby storing carbon dioxide in the closed fracture. In some embodiments, the solidified organic gel can be retained in the closed fracture for at least 1 year (e.g., at least 2 years, at least 5 years, at least 10 years, at least 15 years, at least 20 years, at least 30 years, at least 40 years, at least 50 years, or at least 100 years). In some embodiments, the solidified organic gel can be retained in the closed fracture for 100 years or less (e.g., 50 years or less, 40 years or less, 30 years or less, 20 years or less, 15 years or less, 10 years or less, 5 years or less, 2 years or less, or 1 year or less).

The solidified organic gel can be retained in the closed fracture for a duration ranging from any of the minimum values described above to any of the maximum values described above. For example, in some embodiments, the solidified organic gel can be retained in the closed fracture for from 1 year to 100 years (e.g., from 2 years to 50 years, from 5 years to 40 years, from 10 years to 30 years, from 15 years to 20 years, from 1 year to 20 years, from 2 years to 15 years, from 5 years to 10 years, from 15 years to 100 years, from 20 years to 50 years, or from 30 years to 40 years). In some embodiments, the solidified organic gel can be retained in the closed fracture for greater than 100 years. In yet other embodiments, the solidified organic gel can be retained in the closed fracture indefinitely.

In some embodiments, the organic polymer gel can include carbon dioxide-based monomers and/or oligomers. Examples of carbon dioxide-based monomers and/or oligomers include carbonates (e.g., alkyl carbonates, ether carbonates).

In some embodiments, the solidified organic polymer gel can be retained in the closed fracture, thereby storing carbon dioxide in the closed fracture. In some embodiments, the solidified organic gel can be retained in the closed fracture for at least 1 year (e.g., at least 2 years, at least 5 years, at least 10 years, at least 15 years, at least 20 years, at least 30 years, at least 40 years, at least 50 years, or at least 100 years). In some embodiments, the solidified organic gel can be retained in the closed fracture for 100 years or less (e.g., 50 years or less, 40 years or less, 30 years or less, 20 years or less, 15 years or less, 10 years or less, 5 years or less, 2 years or less, or 1 year or less).

The solidified organic gel can be retained in the closed fracture for a duration ranging from any of the minimum values described above to any of the maximum values described above. For example, in some embodiments, the solidified organic gel can be retained in the closed fracture for from 1 year to 100 years (e.g., from 2 years to 50 years, from 5 years to 40 years, from 10 years to 30 years, from 15 years to 20 years, from 1 year to 20 years, from 2 years to 15 years, from 5 years to 10 years, from 15 years to 100 years, from 20 years to 50 years, or from 30 years to 40 years). In some embodiments, the solidified organic gel can be retained in the closed fracture for greater than 100 years. In some embodiments, the solidified organic gel can be retained in the closed fracture indefinitely.

In some embodiments, the organic polymer gel can further include inorganic nanoparticles. For example, in some embodiments, said nanoparticles can include silica, alumina, aluminosilicates, or any combination thereof. In some embodiments, the nanoparticles can have a diameter of at least 50 nm (e.g., at least 60 nm, at least 70 nm, at least 80 nm, at least 90 nm, at least 100 nm, at least 110 nm, at least 120 nm, at least 120 nm, at least 130 nm, at least 140 nm, at least 150 nm, at least 160 nm, at least 170 nm, at least 180 nm, at least 190 nm, at least 200 nm, at least 210 nm, at least 220 nm, at least 230 nm, at least 240 nm, at least 250 nm, at least 260 nm, at least 270 nm, at least 280 nm, at least 290 nm, or at least 300 nm). In some embodiments, the nanoparticles can have a diameter of 300 nm or less (e.g., 290 nm or less, 280 nm or less, 270 nm or less, 260 nm or less, 250 nm or less, 240 nm or less, 230 nm or less, 220 nm or less, 210 nm or less, 200 nm or less, 190 nm or less, 180 nm, 170 nm or less, 160 nm or less, 150 nm or less, 140 nm or less, 130 nm or less, 120 nm or less, 110 nm or less, 100 nm or less, 90 nm or less, 80 nm or less, 70 nm or less, 60 nm or less, or 50 nm or less).

The nanoparticles can have a diameter ranging from any of the minimum values described above to any of the maximum values described above. For example, in some embodiments, the nanoparticles can have a diameter of from 50 nm to 300 nm (e.g., from 60 nm to 290 nm, from 70 nm to 280 nm, from 80 nm to 270 nm, from 90 nm to 260 nm, from 100 nm to 250 nm, from 110 nm to 240 nm, from 120 nm to 230 nm, from 130 nm to 220 nm, from 140 nm to 210 nm, from 150 nm to 200 nm, from 160 nm to 190 nm, from 170 nm to 180 nm, from 50 nm to 180 nm, from 60 nm to 170 nm, from 70 nm to 160 nm, from 80 nm to 150 nm, from 90 nm to 140 nm, from 100 nm to 130 nm, from 110 nm to 120 nm, from 170 nm to 300 nm, from 180 nm to 290 nm, from 190 nm to 280 nm, from 200 nm to 270 nm, from 210 nm to 280 nm, from 220 nm to 290 nm, from 230 nm to 280 nm, from 240 nm to 270 nm, or from 250 nm to 260 nm).

In some embodiments, the sealant composition can be a polymer system. In some embodiments, the polymer system can include a thermosetting resin. Examples of thermosetting resins include epoxy, urethane, polycarbonate, acrylate, polyethylene, and crosslinked polyethylene (PEX). In some embodiments, the polymer system can be a two-part setting polymer.

In some embodiments, the polymer system can include carbon dioxide-based monomers and/or oligomers. Examples of carbon dioxide-based monomers and/or oligomers include carbonates (e.g., alkyl carbonates, ether carbonates). In some embodiments, the solidified polymer system can be retained in the closed fracture, thereby storing carbon dioxide in the closed fracture. In some embodiments, the solidified polymer system can be retained in the closed fracture for at least 1 year (e.g., at least 2 years, at least 5 years, at least 10 years, at least 15 years, at least 20 years, at least 30 years, at least 40 years, at least 50 years, or at least 100 years). In some embodiments, the solidified polymer system can be retained in the closed fracture for 100 years or less (e.g., 50 years or less, 40 years or less, 30 years or less, 20 years or less, 15 years or less, 10 years or less, 5 years or less, 2 years or less, or 1 year or less).

The solidified polymer system can be retained in the closed fracture for a duration ranging from any of the minimum values described above to any of the maximum values described above. For example, in some embodiments, the solidified polymer system can be retained in the closed fracture for from 1 year to 100 years (e.g., from 2 years to 50 years, from 5 years to 40 years, from 10 years to 30 years, from 15 years to 20 years, from 1 year to 20 years, from 2 years to 15 years, from 5 years to 10 years, from 15 years to 100 years, from 20 years to 50 years, or from 30 years to 40 years). In some embodiments, the solidified polymer system can be retained in the closed fracture for greater than 100 years. In some embodiments, the solidified polymer system can be retained in the closed fracture indefinitely.

In some embodiments, the polymer system can solidify via the injection of a crosslinker. Crosslinkers are known in the art, and a suitable crosslinker could be selected by one of ordinary skill in the art. In some embodiments, the crosslinker can be carbon dioxide based. Examples of carbon dioxide-based crosslinkers include carbonates (e.g., alkyl carbonates, ether carbonates). In some embodiments, the solidified polymer system can be retained in the closed fracture, thereby storing carbon dioxide in the closed fracture. In some embodiments, the solidified polymer system can be retained in the closed fracture for at least 1 year (e.g., at least 2 years, at least 5 years, at least 10 years, at least 15 years, at least 20 years, at least 30 years, at least 40 years, at least 50 years, or at least 100 years). In some embodiments, the solidified polymer system can be retained in the closed fracture for 100 years or less (e.g., 50 years or less, 40 years or less, 30 years or less, 20 years or less, 15 years or less, 10 years or less, 5 years or less, 2 years or less, or 1 year or less).

The solidified polymer system can be retained in the closed fracture for a duration ranging from any of the minimum values described above to any of the maximum values described above. For example, in some embodiments, the solidified polymer system can be retained in the closed fracture for from 1 year to 100 years (e.g., from 2 years to 50 years, from 5 years to 40 years, from 10 years to 30 years, from 15 years to 20 years, from 1 year to 20 years, from 2 years to 15 years, from 5 years to 10 years, from 15 years to 100 years, from 20 years to 50 years, or from 30 years to 40 years). In some embodiments, the solidified polymer system can be retained in the closed fracture for greater than 100 years. In some embodiments, the solidified polymer system can be retained in the closed fracture indefinitely.

In some embodiments, the sealant composition can be cement.

In some embodiments, the cement can solidify upon initiation of a mineralization reaction. Cement mineralization reactions are known in the art, and a suitable initiator could be selected by one of ordinary skill in the art. For example, in some embodiments, the cement can solidify upon injection of water. In some embodiments, the cement can solidify upon injection of carbon dioxide. In some embodiments, the solidified cement can be retained in the closed fracture for at least 1 year (e.g., at least 2 years, at least 5 years, at least 10 years, at least 15 years, at least 20 years, at least 30 years, at least 40 years, at least 50 years, or at least 100 years). In some embodiments, the solidified cement can be retained in the closed fracture for 100 years or less (e.g., 50 years or less, 40 years or less, 30 years or less, 20 years or less, 15 years or less, 10 years or less, 5 years or less, 2 years or less, or 1 year or less).

The solidified cement can be retained in the closed fracture for a duration ranging from any of the minimum values described above to any of the maximum values described above. For example, in some embodiments, the solidified cement can be retained in the closed fracture for from 1 year to 100 years (e.g., from 2 years to 50 years, from 5 years to 40 years, from 10 years to 30 years, from 15 years to 20 years, from 1 year to 20 years, from 2 years to 15 years, from 5 years to 10 years, from 15 years to 100 years, from 20 years to 50 years, or from 30 years to 40 years). In some embodiments, the solidified cement can be retained in the closed fracture for greater than 100 years. In some embodiments, the solidified cement can be retained in the closed fracture indefinitely.

In some embodiments, the sealant composition can further include fibers and/or shape memory particles.

As used herein, "carbon intensity" refers to the quantification of the direct and indirect release of greenhouse gases attributable to consumer and/or industrial activity. The carbon intensity of a sealant composition can be determined from the general formula below.

$$\text{Carbon Intensity} = \text{Total Output}/\text{Total Carbon Emissions}$$

Total Carbon Emissions can be determined by measuring the total amount of carbon dioxide or equivalent greenhouse gases emitted during the production and use of the sealant composition. Total Output can be determined by identifying the quantity of sealant composition produced. Carbon Intensity can then be calculated by dividing the Total Carbon Emissions by the Total Output.

In some embodiments, the sealant composition can have a carbon intensity (CI) of at least 2 kg $CO_2$ (e.g., at least 2.1 kg $CO_2$, at least 2.2 kg $CO_2$, at least 2.3 kg $CO_2$, at least 2.4 kg $CO_2$, at least 2.5 kg $CO_2$, at least 2.6 kg $CO_2$, at least 2.7 kg $CO_2$, at least 2.8 kg $CO_2$, at least 2.9 kg $CO_2$, at least 3 kg $CO_2$, at least 3.1 kg $CO_2$, at least 3.2 kg $CO_2$, at least 3.3 kg $CO_2$, at least 3.4 kg $CO_2$, at least 3.5 kg $CO_2$, at least 3.6 kg $CO_2$, at least 3.7 kg $CO_2$, at least 3.8 kg $CO_2$, at least 3.9 kg $CO_2$, at least 4 kg $CO_2$, at least 4.1 kg $CO_2$, at least 4.2 kg $CO_2$, at least 4.3 kg $CO_2$, at least 4.4 kg $CO_2$, at least 4.5 kg $CO_2$, at least 4.6 kg $CO_2$, at least 4.7 kg $CO_2$, at least 4.8 kg $CO_2$, at least 4.9 kg $CO_2$, at least 5 kg $CO_2$, at least 5.1 kg $CO_2$, at least 5.2 kg $CO_2$, at least 5.3 kg $CO_2$, at least 5.4 kg $CO_2$, at least 5.5 kg $CO_2$, at least 5.6 kg $CO_2$, at least 5.7 kg $CO_2$, at least 5.8 kg $CO_2$, at least 5.9 kg $CO_2$, or at least 6 kg $CO_2$) per kg sealant composition. In some embodiments, the sealant composition can have a carbon intensity (CI) of up to 6 kg $CO_2$ (e.g., up to 5.9 kg $CO_2$, up to 5.8 kg $CO_2$, up to 5.7 kg $CO_2$, up to 5.6 kg $CO_2$, up to 5.5 kg $CO_2$, up to 5.4 kg $CO_2$, up to 5.3 kg $CO_2$, up to 5.2 kg $CO_2$, up to 5.1 kg $CO_2$, up to 5 kg $CO_2$, up to 4.9 kg $CO_2$, up to 4.8 kg $CO_2$, up to 4.7 kg $CO_2$, up to 4.6 kg $CO_2$, up to 4.5 kg $CO_2$, up to 4.4 kg $CO_2$, up to 4.3 kg $CO_2$, up to 4.2 kg $CO_2$, up to 4.1 kg $CO_2$, up to 4 kg $CO_2$, up to 3.9 kg $CO_2$, up to 3.8 kg $CO_2$, up to 3.7 kg $CO_2$, up to 3.6 kg $CO_2$, up to 3.5 kg $CO_2$, up to 3.4 kg $CO_2$, up to 3.3 kg $CO_2$, up to 3.2 kg $CO_2$, up to 3.1 kg $CO_2$, up to 3 kg $CO_2$, up to 2.9 kg $CO_2$, up to 2.8 kg $CO_2$, up to 2.7 kg $CO_2$, up to 2.6 kg $CO_2$, up to 2.5 kg $CO_2$, up to 2.4 kg $CO_2$, up to 2.3 kg $CO_2$, up to 2.2 kg $CO_2$, up to 2.1 kg $CO_2$, or up to 2 kg $CO_2$) per kg sealant composition.

The sealant composition can have a carbon intensity (CI) ranging from any of the minimum values described above to any of the maximum values described above. For example, in some embodiments, the sealant composition can have a carbon intensity of from 2 kg $CO_2$ to 6 kg $CO_2$ (e.g., from 2.1 kg $CO_2$ to 5.9 kg $CO_2$, from 2.2 kg $CO_2$ to 5.8 kg $CO_2$, from 2.3 kg $CO_2$ to 5.7 kg $CO_2$, from 2.4 kg $CO_2$ to 5.6 kg $CO_2$, from 2.5 kg $CO_2$ to 5.5 kg $CO_2$, from 2.6 kg $CO_2$ to 5.4 kg $CO_2$, from 2.7 kg $CO_2$ to 5.3 kg $CO_2$, from 2.8 kg $CO_2$ to 5.2 kg $CO_2$, from 2.9 kg $CO_2$ to 5.1 kg $CO_2$, from 3 kg $CO_2$ to 5 kg $CO_2$, from 3.1 kg $CO_2$ to 4.9 kg $CO_2$, from 3.2 kg $CO_2$ to 4.8 kg $CO_2$, from 3.3 kg $CO_2$ to 4.7 kg $CO_2$, from 3.4 kg $CO_2$ to 4.6 kg $CO_2$, from 3.5 kg $CO_2$, to 4.5 kg $CO_2$, from 3.6 kg $CO_2$ to 4.4 kg $CO_2$, from 3.7 kg $CO_2$ to 4.3 kg $CO_2$, from 3.8 kg $CO_2$ to 4.2 kg $CO_2$, from 3.9 kg $CO_2$ to 4.1 kg $CO_2$, from 2 kg $CO_2$ to 4 kg $CO_2$, from 2.1 kg $CO_2$ to 3.9 kg $CO_2$, from 2.2 kg $CO_2$ to 3.8 kg $CO_2$, from 2.3 kg $CO_2$ to 3.7 kg $CO_2$, from 2.4 kg $CO_2$ to 3.6 kg $CO_2$, from 2.5 kg $CO_2$ to 3.5 kg $CO_2$, from 2.6 kg $CO_2$ to 3.4 kg $CO_2$, from 2.7 kg $CO_2$ to 3.3 kg $CO_2$, from 2.8 kg $CO_2$ to 3.2 kg $CO_2$, from 2.9 kg $CO_2$ to 3.1 kg $CO_2$, from 4 kg $CO_2$ to 6 kg $CO_2$, from 4.1 kg $CO_2$ to 5.9 kg $CO_2$, from 4.2 kg $CO_2$ to 5.8 kg $CO_2$, from 4.3 kg $CO_2$ to 5.7 kg $CO_2$, from 4.4 kg $CO_2$ to 5.6 kg $CO_2$, from 4.5 kg $CO_2$ to 5.5 kg $CO_2$, from 4.6 kg $CO_2$ to 5.4 kg $CO_2$, from 4.7 kg $CO_2$ to 5.3 kg $CO_2$, from 4.8 kg $CO_2$ to 5.2 kg $CO_2$, or from 4.9 kg $CO_2$ to 5.1 kg $CO_2$) per kg sealant composition.

Further, while embodiments are generally discussed herein referencing a single sealant composition, one of ordinary skill in the art will understand that, if multiple sealant compositions are used as described above, each sealant composition can be independently selected from the sealant compositions disclosed herein.

EXAMPLES

The invention will be described in greater detail by way of specific examples. The following examples are offered for illustrative purposes, and are not intended to limit the invention in any manner. Those of skill in the art will readily recognize a variety of non-critical parameters which can be changed or modified to yield essentially the same results. Aspects of these methods (e.g., reaction times, pH values, types and volumes of 2D sheets used, support membrane used, etc.) can be varied from trial to trial. All steps were performed at room temperature.

Figure 5:
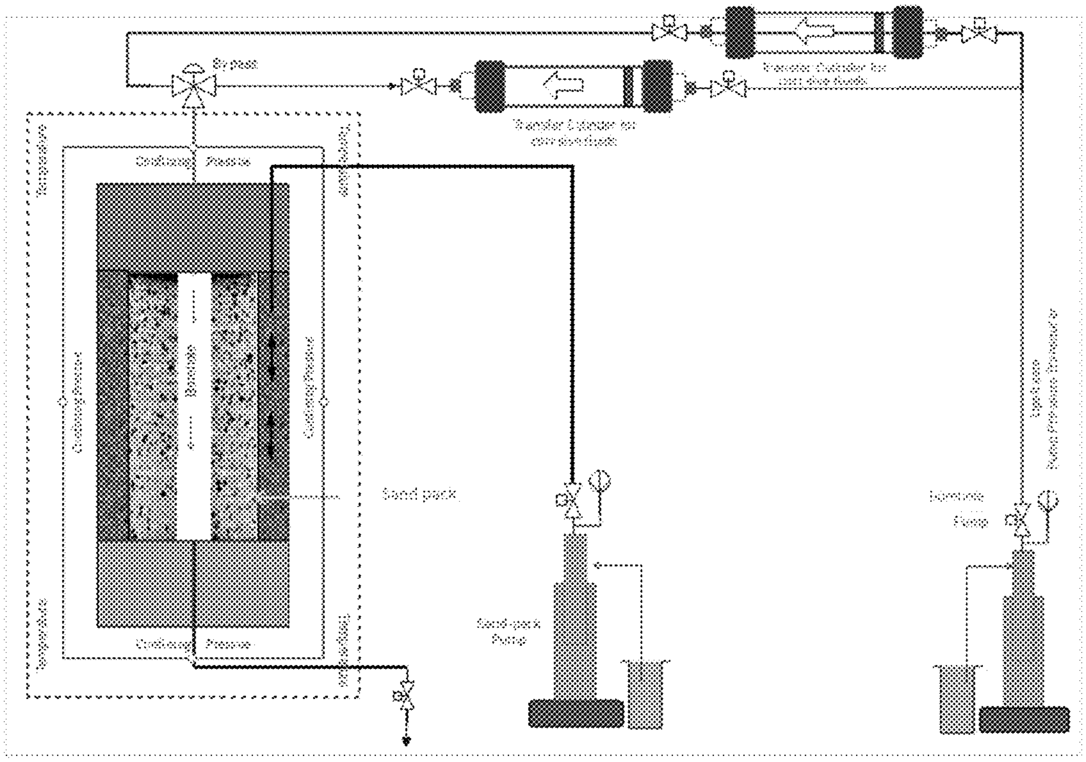
FIG. 5 is a test schematic for completion fluid testing.

An experimental system was used to test sealing of existing fractures in unconventional resources reservoirs to re-fracture hydrocarbon fluid-rich sections while maintaining previous completion design and utilizing existing lateral wells. A schematic of the experimental setup is shown in FIG. 5.

Tests were performed as follows. The rock sample was prepared for testing with a sand-pack around it. A seal was established on top and bottom of the sample to the End-platens. The confining pressure was increased in a controlled way to the desired level (typically to the expected downhole pressures). The rock sample was saturated with water through the sand-pack to mimic reservoir conditions. A pressure gradient was established across the sample to monitor flow/permeability and to calculate a fracture conductivity. The completion fluid including sealant was injected into the centered borehole to place the sealant into the existing fracture. The pressure response was monitored across the sample focusing in particular on the sand pack (high permeability zone). The fracture was fully sealed when the pressure in the sand pack does not respond and stays at the initial pressure. The response of the pressure in the sand pack was used to estimate the conductivity of the fracture. A stress test was performed by increasing the pressure to verify strength of the sealant versus rock (formation).

Results

Figure 6:
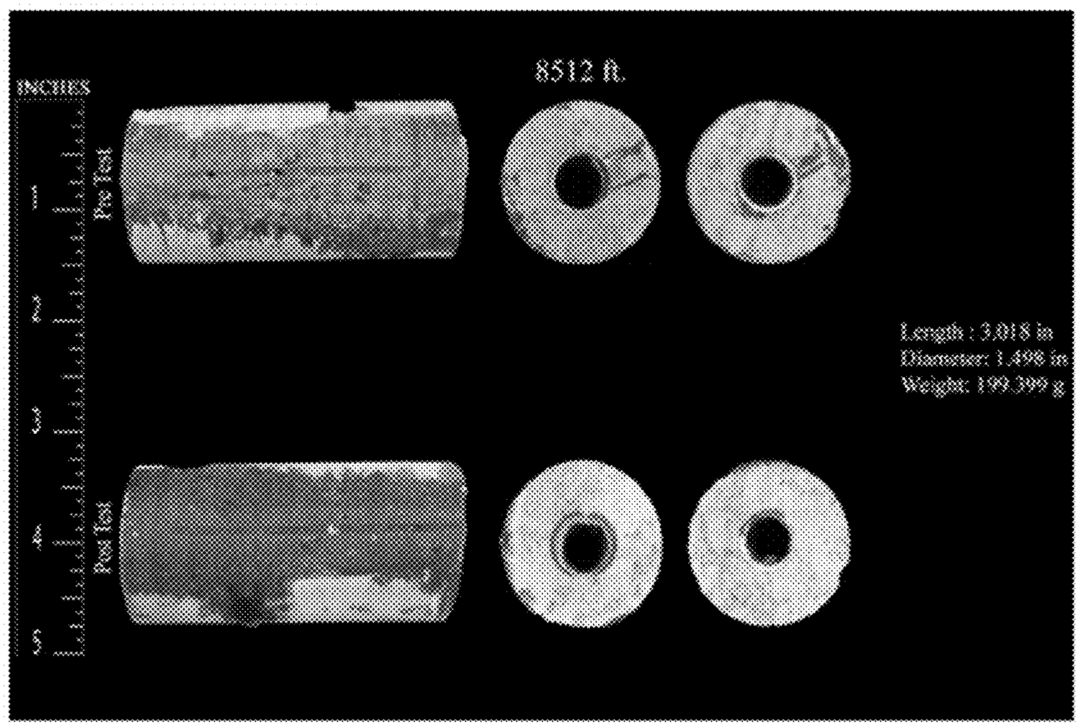
FIG. 6 is an image of the test sample after sealant placement (darker section indicates sealant saturated sample).

Several experiments with reservoir rock samples (shale and silt stone) were performed to verify selected sealant material (e.g., epoxy). The test sample after sealant placement is shown in FIG. 6. As shown in FIG. 6, the sealant hardened after curing and the fracture was filled with sealant. The sample shown on the top shows two sections in which the sealant was not properly placed and an opening provided communication between the borehole and fracture. Due to these weak spots fluid flow could be easily established, and failure occurred during the stress test prior to the planned pressure buildup.

Figure 7:
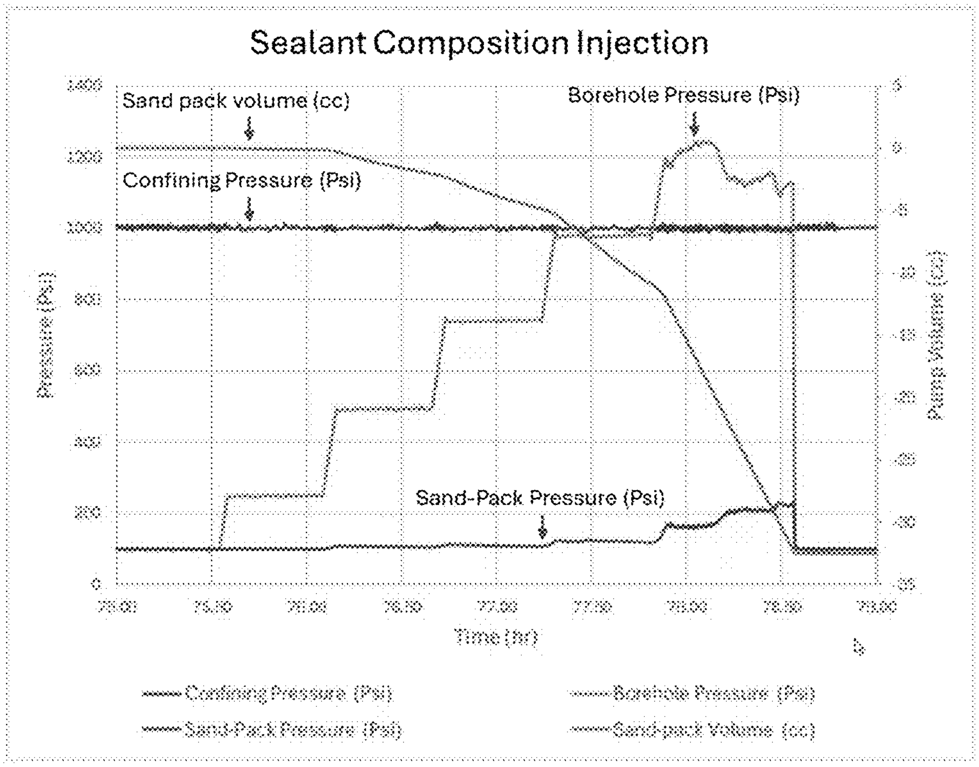
FIG. 7 is a graph of pressure and pump volume versus time at different points measured during the experiment. The traces shown include borehole pressure (equals stepwise increasing injection pressure), sand pack pressure (high-permeability zone to monitor flow behavior and differential pressure), confining pressure, and sand pack volume.

The pressure behavior and pressure communication between the different zones is shown in FIG. 7. In the experiment, the borehole pressure was increased in 250 psi steps. In this test, breakthrough occurred at ~1,000 psi which was indicated by established communication between the borehole and sand pack (slight increase in pressure in sand pack). If the placement of the sealant was correct, then bonding between the sealant and rock sample would have been higher and the breakthrough should have occurred at a much higher pressure.

Figure 8:
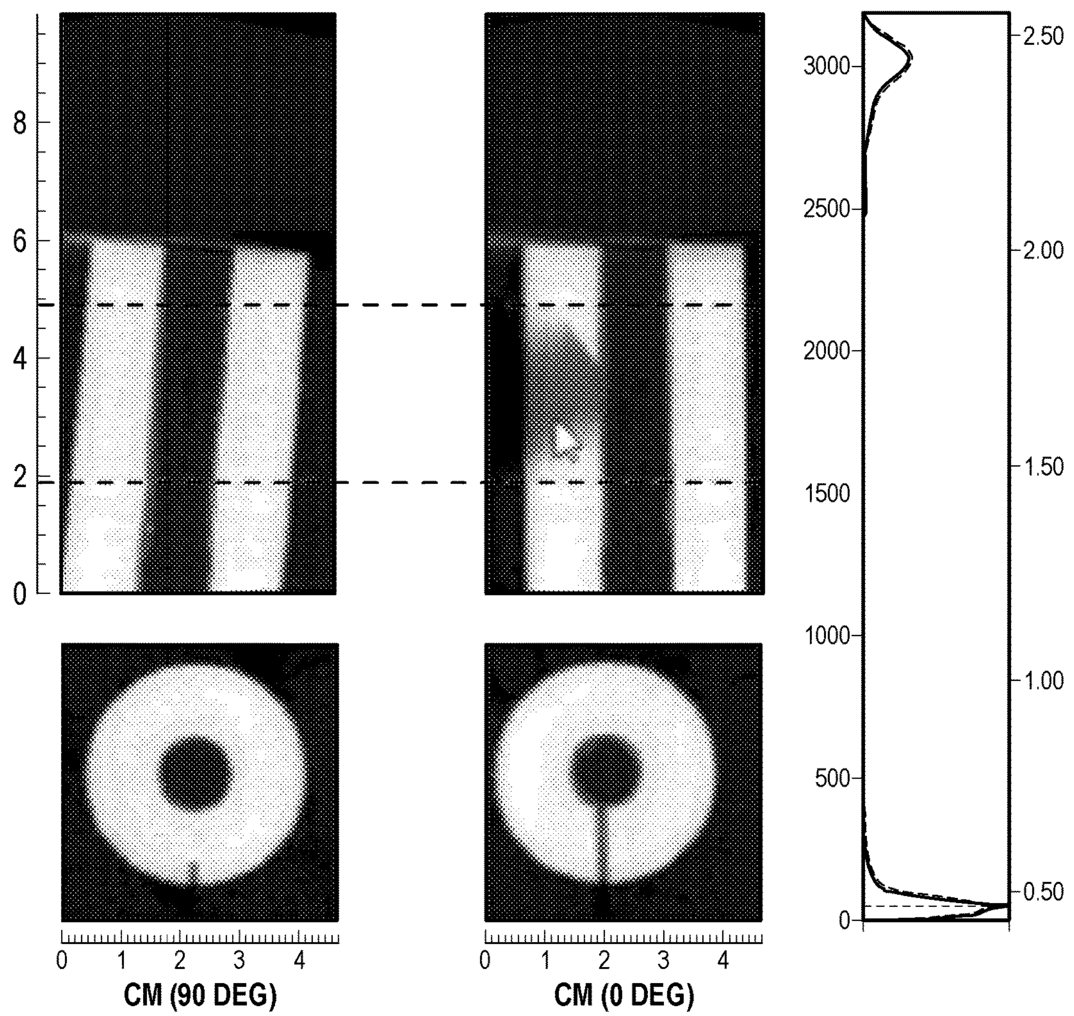
FIG. 8 is a CT-Scan of the test sample assembly after the placement of the sealant.
Figure 8:
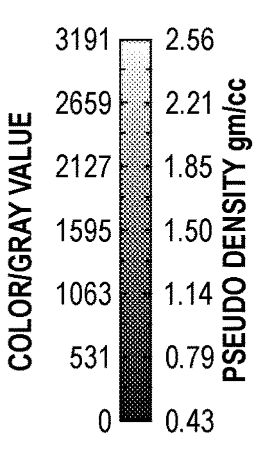

It was expected that the bonding between the rock sample and the sealant is stronger than the rock matrix, resulting in the creation of new fractures due to failure of the rock sample rather than failure of the sealed fracture. The CT-scan in FIG. 8 shows the "weak spot" in which the sealant was not properly placed resulting in higher permeability along the existing fracture and improper bonding between the sealant and the fractured rock.

Future experiments will correct placement of the sealant composition, it is expected that the bonding between the rock sample and the sealant is stronger than the rock matrix, resulting in the creation of new fractures due to failure of the rock rather than failure of the sealed fracture.

EXAMPLE EMBODIMENTS

Certain example implementations are described in the embodiments below.

Embodiment 1: A method comprising:

injecting a sealant composition through a first wellbore in fluid communication with an unconventional subterranean formation such that the sealant composition flows into at least one fracture present in a first region of the unconventional subterranean formation;

wherein the sealant composition solidifies within the fracture, thereby at least partially closing the fracture.

Embodiment 2: The method of embodiment 1, wherein when solidified, the sealant composition is not disposed concentrically about the first wellbore.

Embodiment 3: The method of embodiment 2, wherein when solidified, a portion of the sealant composition extends at least 100 feet from the center of the first wellbore into the fracture.

Embodiment 4: The method of any one of embodiments 1-3, wherein the sealant composition solidifies in the fracture by curing.

Embodiment 5: The method of any one of embodiments 1-4, wherein when solidified, the sealant composition exhibits a Young's modulus that is lower than a Young's modulus of the unconventional subterranean formation in the first region of the unconventional subterranean formation.

Embodiment 6: The method of embodiment 5, wherein when solidified, the sealant composition exhibits a Young's modulus from 5 GPa to 20 GPa.

Embodiment 7: The method of any one of embodiments 1-6, wherein when solidified, the sealant composition exhibits a fracture toughness that is greater than a fracture toughness of the unconventional subterranean formation in the first region of the unconventional subterranean formation.

Embodiment 8: The method of embodiment 7, wherein when solidified, the sealant composition exhibits a fracture toughness from 0.75 MPa $m^{1/2}$ to 1.5 MPa $m^{1/2}$.

Embodiment 9: The method of any one of embodiments 1-8, wherein when solidified, the sealant composition exhibits a brittleness index that is lower than a brittleness index of the unconventional subterranean formation in the first region of the unconventional subterranean formation.

Embodiment 10: The method of embodiment 9, wherein when solidified, the sealant composition exhibits a brittleness index from 0.05 to 0.5.

Embodiment 11: The method of any one of embodiments 1-10, wherein upon solidification, fluid communication between the first wellbore and an adjacent wellbore is decreased as compared to an original degree of fluid communication between the first wellbore and the adjacent wellbore before injection of the sealant composition.

Embodiment 12: The method of embodiment 11, wherein the fluid communication is decreased by from 40% to 90%, as determined by a tracer study.

Embodiment 13: The method of embodiment 12, wherein, upon injection of a tracer into the first wellbore, an amount of the tracer detected in the adjacent wellbore is decreased by from 40% to 90% as compared to an original amount of said tracer detected in the adjacent wellbore before injection of the sealant composition.

Embodiment 14: The method of any one of embodiments 1-13, wherein pressure connectivity between the first wellbore and an adjacent wellbore is decreased as compared to an original pressure connectivity between the first wellbore and the adjacent wellbore before injection of the sealant composition.

Embodiment 15: The method of embodiment 14, wherein, upon application of a first pressure to the first wellbore, a second pressure detected in the adjacent wellbore is decreased by from 40% to 90% as compared to an original second pressure detected in the adjacent wellbore before injection of the sealant composition.

Embodiment 16: The method of any one of embodiments 1-14, wherein permeability of the first region is decreased as compared to an original permeability of the first region before injection of the sealant composition.

Embodiment 17: The method of embodiment 16, wherein permeability of the first region is decreased by from 50% to 99%.

Embodiment 18: The method of any one of embodiments 16-17, wherein permeability of the first region is decreased by at least 3 orders of magnitude.

Embodiment 19: The method of any one of embodiments 16-18, wherein permeability of the first region is decreased to a level below an original permeability of the first region of the unconventional subterranean formation.

Embodiment 20: The method of any one of embodiments 1-19, further comprising injecting a fracturing fluid through the first wellbore;

wherein the fracturing fluid is injected at a pressure and flow rate effective to form a fracture in a second region of the unconventional subterranean formation.

Embodiment 21: The method of embodiment 20, wherein the method comprises:

a) injecting the sealant composition through the first wellbore in fluid communication with the unconventional subterranean formation such that the sealant composition flows into the at least one fracture present in the first region in proximity to the first wellbore, wherein the sealant composition solidifies within the fracture, thereby at least partially closing the fracture;

(b) injecting a fracturing fluid through the first wellbore, wherein the fracturing fluid is injected at a pressure and flow rate effective to form a fracture in a second region of the unconventional subterranean formation; and (c) producing fluids from the first wellbore.

Embodiment 22: The method of any one of embodiments 1-21, further comprising injecting a fracturing fluid through a second wellbore in fluid communication with the unconventional subterranean formation, wherein the fracturing fluid is injected at a pressure and flow rate effective to form a fracture in a second region of the unconventional subterranean formation.

Embodiment 23: The method of embodiment 22, wherein the method comprises:

a) injecting the sealant composition through the first wellbore in fluid communication with the unconventional subterranean formation such that the sealant composition flows into the at least one fracture present in the first region in proximity to the first wellbore, wherein the sealant composition solidifies within the fracture, thereby at least partially closing the fracture;

(b) injecting a fracturing fluid through the second wellbore in fluid communication with the unconventional subterranean formation, wherein the fracturing fluid is injected at a pressure and flow rate effective to form a fracture in a second region of the unconventional subterranean formation; and (c) producing fluids from the first wellbore, the second wellbore, or any combination thereof.

Embodiment 24: The method of any one of embodiments 21-23 wherein when solidified, the sealant composition inhibits initiation of fractures in the first region.

Embodiment 25: The method of any one of embodiments 21-24, wherein when solidified, the sealant composition preferentially directs the initiation of fractures toward the second region.

Embodiment 26: The method of any one of embodiments 21-25, wherein the second wellbore comprises an existing wellbore.

Embodiment 27: The method of any one of embodiments 21-26, wherein the second wellbore comprises a new wellbore.

Embodiment 28: The method of any one of embodiments 21-27, wherein the second wellbore comprises an infill wellbore.

Embodiment 29: The method of any one of embodiments 21-28, wherein the second region is previously unfractured or underfractured.

Embodiment 30: The method of any one of embodiments 21-29, wherein when solidified, the sealant composition increases the formation of fractures in the second region.

Embodiment 31: The method of any one of embodiments 1-30, further comprising:

injecting an etching agent through the first wellbore, thereby at least partially removing the solidified sealant composition.

Embodiment 32: The method of embodiment 31, wherein the etching agent comprises a strong acid or a strong base.

Embodiment 33: The method of any one of embodiments 31-32, wherein injection of the etching agent increases fluid flow through the fracture in the first region of the unconventional subterranean formation.

Embodiment 34: The method of any one of embodiments 31-33, wherein injection of the etching agent increases permeability of the first region as compared to a permeability of the first region after injection of the sealant composition but before injection of the etching agent.

Embodiment 35: The method of any one of embodiments 1-34, wherein the sealant composition comprises an inorganic gel.

Embodiment 36: The method of embodiment 35, wherein the inorganic gel comprises silica, alumina, an aluminosilicate, or any combination thereof.

Embodiment 37: The method of any of embodiments 35-36, wherein the inorganic gel comprises a plurality of nanoparticles.

Embodiment 38: The method of any one of embodiments 35-37, wherein the inorganic gel has a solids content of from 1% to 15%.

Embodiment 39: The method of any one of embodiments 35-38, wherein the inorganic gel comprises one or more stabilizing agents.

Embodiment 40: The method of embodiment 39, wherein the stabilizing agent comprises an ammonium cation.

Embodiment 41: The method of any one of embodiments 35-40, wherein the inorganic gel solidifies upon contact with a pH altering agent.

Embodiment 42: The method of embodiment 41, wherein the method further comprises injecting the pH altering agent through the first wellbore in fluid communication with the unconventional subterranean formation such that the pH altering agent induces solidification of the inorganic gel within the at least one fracture.

Embodiment 43: The method of any one of embodiments 1-34, wherein the sealant composition comprises a polymer.

Embodiment 44: The method of embodiment 43, wherein the polymer solidifies upon reaction with a crosslinker.

Embodiment 45: The method of embodiment 44, wherein the method further comprises injecting the crosslinker through the first wellbore in fluid communication with the unconventional subterranean formation such that the crosslinker reacts with and crosslinks the polymer, inducing solidification of the polymer within the at least one fracture.

Embodiment 46: The method of any one of embodiments 44-45, wherein the crosslinker is carbon dioxide-based.

Embodiment 47: The method of embodiment 46, wherein the crosslinked polymer gel is retained in the closed fracture, thereby storing carbon dioxide in the at least one fracture.

Embodiment 48: The method of any one of embodiments 43-47, wherein the polymer is derived from at least one carbon dioxide-based monomer.

Embodiment 49: The method of embodiment 48, wherein the polymer is retained in the closed fracture, thereby storing carbon dioxide in the at least one fracture.

Embodiment 50: The method of any one of embodiments 43-49, wherein the polymer solidifies upon crosslinking with inorganic nanoparticles.

Embodiment 51: The method of embodiment 50, wherein the inorganic nanoparticles comprise silica, alumina, aluminosilicates, or any combination thereof.

Embodiment 52: The method of any one of embodiments 43-51, wherein the polymer comprises a thermosetting resin.

Embodiment 53: The method of embodiment 52, wherein the thermosetting resin comprises an epoxy resin, a urethane resin, a polycarbonate resin, a (meth)acrylate resin, a polyolefin resin, such as a polyethylene resin, a crosslinked polyethylene (PEX) resin, or a polypropylene resin, or any combination thereof.

Embodiment 54: The method of any one of embodiments 43-53, wherein the polymer comprises a two-part curable polymer system.

Embodiment 55: The method of any one of embodiments 1-34, wherein the sealant composition comprises a cement.

Embodiment 56: The method of embodiment 55, wherein the cement solidifies via a mineralization reaction.

Embodiment 57: The method of any one of embodiments 55-56, wherein the cement solidifies upon injection of water.

Embodiment 58: The method of any one of embodiments 55-57, wherein the cement solidifies upon injection of carbon dioxide.

Embodiment 59: The method of embodiment 58, wherein the solidified cement is retained in the closed fracture, thereby storing carbon dioxide in the at least one fracture.

Embodiment 60: The method of any one of embodiments 1-59, wherein the sealant composition comprises any combination of an inorganic gel, a polymer, and a cement.

Embodiment 61: The method of any one of embodiments 1-60, wherein the sealant composition further comprises a filler.

Embodiment 62: The method of embodiment 61, wherein the filler comprises fibers, a particulate filler, or any combination thereof.

Embodiment 63: The method of any one of embodiments 62-62, wherein the filler comprises a shape memory filler.

Embodiment 64: The method of any one of embodiments 1-63, wherein the sealant composition has a carbon intensity (CI) from 2 kg $CO_2$ to 6 kg $CO_2$ per kg sealant composition.

Embodiment 65: The method of any one of embodiments 1-64, wherein injecting the sealant composition through a first wellbore further comprises injecting carbon dioxide through the first wellbore.

Embodiment 66: The method of embodiment 65, wherein carbon dioxide is injected through the first wellbore before injection of the sealant composition.

Embodiment 67: The method of any one of embodiments 61-62, wherein the carbon dioxide is bubbled through the injected sealant composition.

Embodiment 68: The method of any one of embodiments 1-67, wherein the solidified sealant composition is retained in the closed fracture, thereby storing carbon dioxide in the at least one fracture.

Embodiment 69: The method of any one of embodiments 1-68, wherein the sealant composition is a fluid sealant composition.

Embodiment 70: The method of any one of embodiments 1-69, wherein the sealant composition has a viscosity of from 1 cp to 100 cp at a temperature of the unconventional subterranean formation.

Embodiment 71: The method of any one of embodiments 1-70, further comprising injecting a chaser through the first wellbore after injection of the sealant composition, thereby pushing the sealant composition further into the at least one fracture.

Embodiment 72: The method of embodiment 71, wherein the chaser has a higher viscosity than the sealant composition.

Embodiment 73: The method of any one of embodiments 71-72, wherein the chaser comprises an aqueous injection fluid.

Embodiment 74: The method of embodiment 73, wherein the aqueous injection fluid comprises a polymer.

Embodiment 75: The method of any one of embodiments 1-74, wherein injecting the sealant composition through a first wellbore further comprises sequentially injecting a plurality of sealant compositions having increasing viscosity through the first wellbore.

Embodiment 76: The method of embodiment 75, wherein injecting the sealant composition through a first wellbore comprises:

(i) injecting a first sealant composition having a first viscosity at a temperature of the unconventional subterranean formation through the first wellbore;

(ii) injecting a second sealant composition having a second viscosity at a temperature of the unconventional subterranean formation through the first wellbore; and (iii) injecting a third sealant composition having a third viscosity at a temperature of the unconventional subterranean formation through the first wellbore;

wherein each of the first sealant composition, the second sealant composition, and the third sealant composition each solidify within the fracture, thereby at least partially closing the fracture.

Embodiment 77: The method of embodiment 76, wherein the second viscosity is from 10% to 150% greater than the first viscosity, and wherein the third viscosity is from 10% to 150% greater than the second viscosity.

Embodiment 78: The method of any one of embodiments 75-77, wherein each sealant composition extends substantially concentrically into the unconventional subterranean formation from the first wellbore, and wherein injection of each sealant composition pushes already-injected sealant compositions further into the fracture.

Embodiment 79: A method for storing carbon dioxide within an unconventional subterranean formation, the method comprising:

injecting a sealant composition through a first wellbore in fluid communication with the unconventional subterranean formation such that the sealant composition flows into at least one fracture present in a first region of the first wellbore;

wherein the sealant composition solidifies within the fracture, thereby at least partially closing the fracture; and wherein the solidified sealant has a carbon intensity (CI) of from 2 kg $CO_2$ to 6 kg $CO_2$.

The methods of the appended claims are not limited in scope by the specific methods described herein, which are intended as illustrations of a few aspects of the claims. Any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A method comprising:

injecting a sealant composition through a first wellbore in fluid communication with an unconventional subterranean formation such that the sealant composition flows into at least one fracture present in a first region of the unconventional subterranean formation;

wherein the sealant composition solidifies within the fracture, thereby at least partially closing the fracture;

injecting a fracturing fluid through the first wellbore or through a second wellbore in fluid communication with the unconventional subterranean formation, wherein the fracturing fluid is injected at a pressure and flow rate effective to form a fracture in a second region of the unconventional subterranean formation; and producing fluids from the first wellbore.

2. The method of claim 1, wherein when solidified, the sealant composition is not disposed concentrically about the first wellbore.

3. The method of claim 2, wherein when solidified, a portion of the sealant composition extends at least 100 feet from the center of the first wellbore into the fracture.

4. The method of claim 1, wherein the sealant composition solidifies in the fracture by curing.

5. The method of claim 1, wherein when solidified, the sealant composition exhibits a Young's modulus from 5 GPa to 20 GPa.

6. The method of claim 1, wherein when solidified, the sealant composition exhibits a fracture toughness from 0.75 MPa $m^{1/2}$ to 1.5 MPa $m^{1/2}$.

7. The method of claim 1, wherein when solidified, the sealant composition exhibits a brittleness index from 0.05 to 0.5.

8. The method of claim 1, further comprising injecting a tracer into the first wellbore, wherein the first wellbore is adjacent another wellbore and wherein an amount of the tracer detected in the adjacent another wellbore is decreased by from 40% to 90% as compared to an original amount of said tracer detected in the adjacent wellbore before the injecting of the sealant composition.

9. The method of claim 1, further comprising applying a first pressure to the first wellbore, wherein the first wellbore is adjacent another wellbore and wherein a second pressure detected in the adjacent another wellbore is decreased by from 40% to 90% as compared to an original second pressure detected in the adjacent wellbore before the injecting of the sealant composition.

10. The method of claim 1, wherein permeability of the first region is decreased by from 50% to 99% compared to an original permeability of the first region before injection of the sealant composition.

11. The method of claim 1, wherein the second wellbore in fluid communication with the unconventional subterranean formation comprises an existing wellbore, a new wellbore, or an infill wellbore.

12. The method of claim 1, further comprising:

injecting an etching agent through the first wellbore, thereby at least partially removing the solidified sealant composition.

13. The method of claim 1, wherein the sealant composition comprises an inorganic gel, a polymer, a cement, a filler, a fluid sealant composition, or any combination thereof.

14. The method of claim 13, wherein when the sealant composition comprises:

the inorganic gel, the inorganic gel solidifies upon contact with a pH altering agent;

the cement, the cement solidifies via a mineralization reaction, upon injection of water, upon injection of carbon dioxide, or any combination thereof;

the polymer, the polymer solidifies upon reaction with a crosslinker;

or any combination thereof.

15. The method of claim 1, wherein the solidified sealant composition is retained in the closed fracture, thereby storing carbon dioxide in the at least one fracture.

16. The method of claim 1, wherein injecting the sealant composition through a first wellbore further comprises injecting carbon dioxide through the first wellbore, wherein the carbon dioxide is injected through the first wellbore before injection of the sealant composition, or the carbon dioxide is bubbled through the injected sealant composition.

17. The method of claim 1, further comprising injecting a chaser through the first wellbore after injection of the sealant composition, thereby pushing the sealant composition further into the at least one fracture.

18. The method of claim 1, wherein injecting the sealant composition through a first wellbore further comprises sequentially injecting a plurality of sealant compositions having increasing viscosity through the first wellbore.

19. A method for storing carbon dioxide within an unconventional subterranean formation, the method comprising:

injecting carbon dioxide and a sealant composition through a first wellbore in fluid communication with the unconventional subterranean formation such that the sealant composition flows into at least one fracture present in a first region of the first wellbore;

wherein the sealant composition solidifies within the fracture, thereby at least partially closing the fracture and storing carbon dioxide; and wherein the solidified sealant has a carbon intensity (CI) of from 2 kg $CO_2$ to 6 kg $CO_2$.

20. The method of claim 1, wherein the solidified sealant composition is retained in the closed fracture for at least one year or more.

* * * * *